US011714566B2

(12) United States Patent
Idicula et al.

(10) Patent No.: US 11,714,566 B2
(45) Date of Patent: Aug. 1, 2023

(54) CUSTOMIZABLE PROGRESSIVE DATA-TIERING SERVICE

(71) Applicant: Amazon Technologies, Inc., Seattle, WA (US)

(72) Inventors: Binu Kuttikkattu Idicula, Kerala (IN); Nagarathan M, Guntur (IN); Akshi Raina, Hyderabad (IN); Jaya Talreja, Indore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/510,048

(22) Filed: Oct. 25, 2021

(65) Prior Publication Data
US 2022/0043594 A1 Feb. 10, 2022

Related U.S. Application Data

(63) Continuation of application No. 16/367,100, filed on Mar. 27, 2019, now Pat. No. 11,221,782.

(51) Int. Cl.
*G06F 3/06* (2006.01)

(52) U.S. Cl.
CPC .......... *G06F 3/0647* (2013.01); *G06F 3/0611* (2013.01); *G06F 3/0683* (2013.01)

(58) Field of Classification Search
None
See application file for complete search history.

(56) References Cited

U.S. PATENT DOCUMENTS

| 5,404,510 | A | 4/1995 | Smith et al. |
| 5,918,225 | A | 6/1999 | White et al. |
| 6,502,088 | B1 | 12/2002 | Gajda et al. |
| 6,591,269 | B1 | 7/2003 | Ponnekanti |
| 6,778,977 | B1 | 8/2004 | Avadhanam et al. |
| 6,914,883 | B2 | 7/2005 | Dharanikota |
| 6,947,750 | B2 | 9/2005 | Kakani et al. |
| 8,239,584 | B1 | 8/2012 | Rabe et al. |
| 8,595,267 | B2 | 11/2013 | Sivasubramanian et al. |
| 8,918,435 | B2 | 12/2014 | Sivasubramanian et al. |
| 9,052,830 | B1 * | 6/2015 | Marshak ............... G06F 3/0665 |
| 9,432,459 | B2 | 8/2016 | Sivasubramanian et al. |

(Continued)

OTHER PUBLICATIONS

U.S. Appl. No. 15/866,332, filed Jan. 9, 2018, Manu Anand.
U.S. Appl. No. 15/861,508, filed Jan. 3, 2018, Manu Anand.
U.S. Appl. No. 15/690,175, filed Aug. 29, 2017, Manu Anand.

*Primary Examiner* — Stephanie Wu
(74) *Attorney, Agent, or Firm* — Robert C. Kowert; Kowert, Hood, Munyon, Rankin & Goetzel, P.C.

(57) ABSTRACT

A tiering service enables a client to custom specify service level agreements for data items to be tiered and automatically promotes and demotes the data items amongst a warm tier, a plurality of intermediate tiers, and a cold tier to ensure the service level agreement commitments are met. In some embodiments, a client specifies segmentation criteria for defining multiple segments of data items included in a data scope or table and assigns latency targets to the segments in order to define the service level agreement. Also, in some embodiments, a plurality of intermediate tiers are implemented on common underlying hardware by varying metadata management to implement intermediate tiers that have progressively increasing latencies.

20 Claims, 19 Drawing Sheets

(56) References Cited

U.S. PATENT DOCUMENTS

| | | |
|---|---|---|
| 9,639,546 B1 | 5/2017 | Gorski et al. |
| 9,754,009 B2 | 9/2017 | Sivasubramanian et al. |
| 10,579,597 B1 | 3/2020 | Anand |
| 10,817,203 B1 | 10/2020 | Anand et al. |
| 11,151,081 B1 | 10/2021 | Anand |
| 2002/0087699 A1 | 7/2002 | Karagiannis et al. |
| 2007/0195788 A1 | 8/2007 | Vasamsetti et al. |
| 2012/0317155 A1 | 12/2012 | Ogasawara et al. |
| 2013/0166839 A1* | 6/2013 | Burton ............... G06F 3/0689 711/E12.019 |
| 2014/0310455 A1* | 10/2014 | Baldwin ............. G06F 3/0641 711/114 |
| 2015/0378628 A1* | 12/2015 | Golander ........... G06F 3/0647 711/162 |
| 2018/0210656 A1* | 7/2018 | Sato ..................... G06F 3/067 |
| 2019/0215363 A1* | 7/2019 | Olson ................ H04L 67/568 |
| 2020/0042618 A1* | 2/2020 | Mukku .............. G06F 3/0649 |

* cited by examiner

250

Tiering Execution Service Page

○ https://<website>.com/Tiering Execution Service

*Welcome to Service Level Agreement (SLA) Selection.*

*Here, you can select criteria for data items and specify for data items having such criteria, a latency target for accessing the data items. Additionally, you can select different latency targets for accessing the data items having such criteria, as the data items age (e.g. as time passes since the data items were last accessed or modified).*

252

| 254 | Age Range #1/ Target Latency | Age Range #2/ Target Latency | ... | Age Range #N/ Target Latency | |
|---|---|---|---|---|---|
| Data Attribute #1 | | | | | |
| Order Status=Delivered | 0-1 day | 1-7 days | | 7-30 days | ←260 |
| | <50 ms | <500 ms | | <1,000 ms | ←262 |
| 256 | | | | | |
| Data Attribute #2 | | | | | |
| Order Status=Closed | 0-1 day | 1-30 days | | >30 days | ←264 |
| | <500 ms | <1500 ms | | <2,500 ms | ←266 |
| ⋮ | | | | | |
| 258 | | | | | |
| Data Attribute #N | | | | | |
| Customer Status=Repeat | 0-10 days | 10-60 days | | 7-30 days | ←270 |
| | <50 ms | <500 ms | | <1,000 ms | ←272 |

274 ⟶ [Submit!]

*FIG. 2B*

CUSTOMIZABLE PROGRESSIVE DATA-TIERING SERVICE

This application is a continuation of U.S. patent application Ser. No. 16/367,100, filed Mar. 27, 2019, which is hereby incorporated by reference herein its entirety.

BACKGROUND

A distributed system may offer, to various clients, access to data storage resources, computing resources and various services implemented using the data storage and/or computing resources of the distributed system. For example, using such resources, a provider network may store data on behalf of clients of the provider network in various types of storage solutions. The provider network may offer various types of storage-related services for managing stored data, such as database services, object-based storage services, cloud computing services, etc.

For various reasons, some pieces of data stored in a distributed system for a client, such as a provider network, may be accessed less frequently than other pieces of data. Also delays in access to some pieces of data stored in a distributed system for a client may have less of an impact on the client's operations than delays in accessing other pieces of data stored in the distributed system for the client. As access requirements change, some pieces of data stored in a distributed system may end up being stored on resources that meet greater (and more costly) access requirements for the pieces of data than necessary to meet the client's needs. For clients that store large quantities of such pieces of data, storage of the pieces of data in such higher performance resources may lead to an inefficient allocation of storage resources and unnecessary storage costs.

In some situations less frequently accessed pieces of data may be relocated to a lower cost storage. This may reduce storage costs and remove the less frequently accessed pieces of data from a higher performance storage resource, thus improving performance of the higher performance storage resource and reducing storage costs. However, relocation of the pieces of data to the lower cost storage may cause a large jump in the latency for accessing the pieces of data that have been relocated to the lower cost storage. For some clients of a distributed system, such a large jump in latency may negatively impact the client's operations and performance.

BRIEF DESCRIPTION OF THE DRAWINGS

FIG. 2B illustrates an example client interface to the tiering service that enables a client to specify a service level agreement (SLA) for various client-defined data segments of a data scope to be tiered by the tiering service, according to some embodiments.

Figure 1:
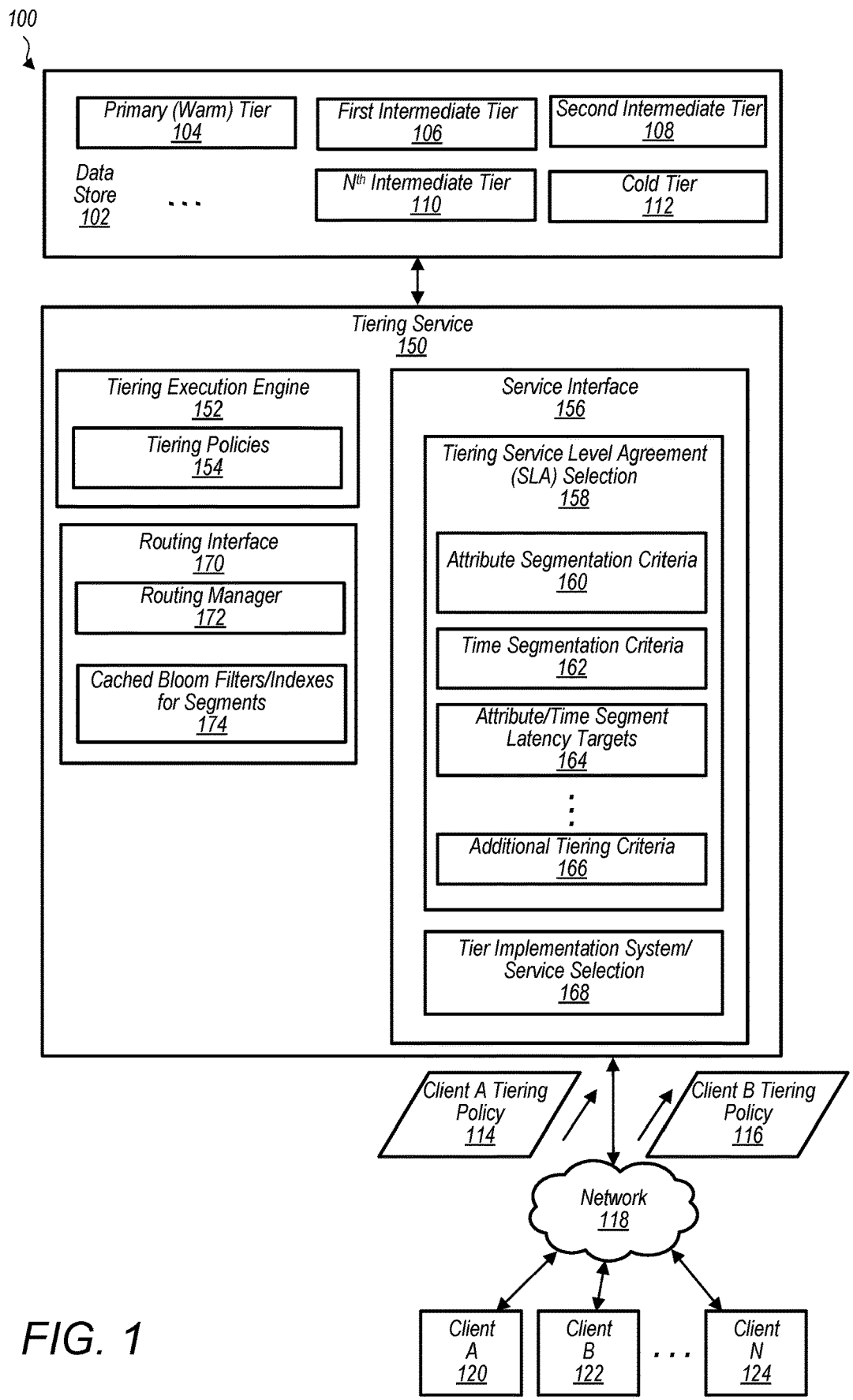
FIG. 1 illustrates a data store comprising a warm tier, a plurality of intermediate tiers, and a cold tier; and a tiering service that automatically promotes or demotes data items amongst the warm tier, the plurality of intermediate tiers, and the cold tier, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for a data tiering service are described herein.

In some embodiments, a system includes multiple nodes configured to implement a data store comprising a warm tier, a plurality of intermediate tiers, and a cold tier, wherein the warm tier has a lower latency for data access than the cold tier, and wherein respective ones of the plurality of intermediate tiers have progressively increasing respective latencies between a latency of the warm tier and a latency of the cold tier. For example, the warm tier may comprise one or more non-searchable query language (NoSQL) tables (also referred to herein as "data scopes") and the intermediate and cold tiers may comprise flat files comprising data items relocated from the one or more NoSQL tables to the intermediate and cold tiers. In some embodiments, the flat files of various ones of the intermediate tiers or cold tier may be stored in a remote object-based storage system, an elastic file storage system, or may be locally stored on one or more local nodes local to a node implementing the one or more NoSQL tables.

The system also includes one or more computing devices configured to implement a tiering execution service for the warm tier, the plurality of intermediate tiers, and the cold tier of the data store. The tiering execution service is configured to receive a tiering policy for a data scope stored in, or to be stored in, the data store, wherein the data scope comprises a plurality of key-value data items, and wherein the tiering policy comprises: segmentation criteria for dynamically determining to which of a plurality of data segments respective ones of the data items of the data scope currently belong; and corresponding latency targets for the plurality of data segments. The one or more computing devices configured to implement the tiering service are also configured to dynamically assign key-value data items of the data scope to respective ones of the data segments based on the segmentation criteria and dynamically promote or demote the key-value data items amongst the warm tier, the cold tier, and the plurality of intermediate tiers based, at least in part on: current data segments to which the respective key-value data items are currently assigned; and the latency targets for the data segments to which the respective key-value data items are assigned. The tiering execution service promotes or demotes the key-value data items amongst the warm tier, the cold tier, and the plurality of intermediate tiers based on the segmentation criteria and latency targets such that the received tiering policy is enforced.

In some embodiments, the tiering service includes a tiering execution engine configured to manage relocation of one or more of the data items from the warm tier to the plurality of intermediate tiers and the cold tier (e.g. promotion and demotion of the data items) in accordance with a client selected or specified service level agreement (SLA) comprising the segmentation criteria and the related latency targets for the segments. In some embodiments, the tiering service may be included in a data storage system that implements the data store or may be a separate service that interacts with a data store to perform tiering.

As opposed to tiering systems that include a single warm tier and a single cold tier or a limited number of cold tiers, a data store comprising a warm tier, a plurality of intermediate tiers, and a cold tier may provide smooth progressive transitions in access latency for data items as the data items are relocated from lower latency intermediate tiers to higher latency intermediate tiers or to the cold tier. Additionally, a client may customize a service level agreement (SLA) for the client's data such as data scopes or tables of a No-SQL database. The client may specify data attributes, access characteristics, data ages, and/or other criteria (and combinations thereof) for determining segments of the client's data. The client may further specify, via the SLA, latency targets for such segments. In this way, the client may not be concerned with which of the plurality of intermediate tiers a data item is relocated to, but may rather rely on the tiering service to determine to which tier to relocate a data item such that a latency target is met for the data item, wherein the data item falls within one of the classifications (segmentation criteria) specified by the client via the SLA. In this way, the client may customize an SLA to fit the client's needs and delegate management of tiering data items amongst the various tiers to the tiering service with assurance, via the SLA, that the client's specified latency targets for various classifications of data items will be met.

Moreover, in some embodiments, the tiering service may implement the plurality of intermediate tiers using a single storage system, such as an object-based storage service. For example, the tiering service may vary how much metadata is generated for data items in different ones of the tiers and where the metadata is stored, in order to offer varying access latencies for the data items using the same single storage system. In some embodiments, a tiering service may implement the plurality of intermediate tiers using more than one storage system, but may implement more than one of the intermediate tiers on a given storage system or service. This can be contrasted to other systems that utilize different types of hardware to achieve different tiers, such as using solid-state hardware for a warm tier, hard disk drives for an intermediate tier, and tapes for a cold tier, wherein the number of tiers offered is limited by the different types of hardware used.

In some embodiments, the tiering service also includes a routing interface and a routing manager. The routing manager may be configured to receive a request directed to a data item that has been relocated from the warm tier to one of the plurality of intermediate tiers or the cold tier; and cause the data item stored in the intermediate tier or cold tier to be retrieved. In some embodiments, the routing interface may include cached bloom filters for the directory files included in the various intermediate tiers and/or the cold tier, and the routing manager may utilize the bloom filters to locate a directory file that includes a requested data item. In some embodiments, the routing interface may additionally or alternatively include one or more indexes for the directory files, and may utilize the indexes to locate a directory file that includes the requested data item.

In some embodiments, a method includes receiving, by a data tiering service, a service level agreement (SLA) for a data scope, wherein the data scope comprises a plurality of data items, and wherein the SLA comprises latency targets for categories of the data items of the data scope. The method further includes dynamically determining to which of a plurality of data segments respective ones of the data items currently belong based on one or more segmentation criteria corresponding to the categories specified in the SLA. The method also includes dynamically promoting or demoting the data items of the data scope amongst a warm tier, a cold tier, and a plurality of intermediate tiers of a data store based, at least in part on: the data segments to which the data items are determined to currently belong; and the latency targets for the categories of the data items that correspond with the data segments, wherein the data items are promoted or demoted amongst the warm tier, the cold tier, or the plurality of intermediate tiers in conformance with the SLA for the data scope.

In some embodiments, one or more non-transitory computer readable media store program instructions that, when executed on or across one or more processors, cause the one or more processors to be enabled to receive a service level agreement (SLA) for a data scope, wherein the data scope comprises a plurality of data items, and wherein the SLA comprises latency targets for categories of the data items of the data scope; dynamically determine to which of a plurality of data segments respective ones of the data items belong based on one or more segmentation criteria corresponding to the categories specified in the SLA; and dynamically promote or demote the data items of the data scope amongst a warm tier, a cold tier, and a plurality of intermediate tiers based, at least in part on: the data segments to which the data items belong; and the latency targets for the categories of the data items that correspond with the data segments, wherein the data items are promoted or demoted amongst the warm tier, the cold tier, and the plurality of intermediate tiers in conformance with the SLA for the data scope.

In some embodiments, a warm tier may be implemented using a NoSQL database system, while the intermediate tiers and the cold tier may be implemented using an object-based storage system, as two examples. In some embodiments, data items stored in the intermediate tiers or the cold tier may be stored in flat files. In some embodiments, various amounts of metadata may be stored for the flat files in various ones of the intermediate tiers. For example, lower latency intermediate tiers may include metadata, such as directory files, that may be referend to quickly locate a data item in a flat file stored on a cold tier node. Conversely, in order to reduce storage and processing costs, higher latency intermediate tiers may store flat files with less metadata, such as without storing a directory file for the flat file.

In some embodiments, lower latency intermediate tiers may store a directory file in a cache storage of a warm tier node. This may reduce a number of times a cold tier node needs to be accessed to locate a data item. For example, an intermediate tier that includes a directory file cached in a warm tier node may only require a single access to a cold tier node to retrieve a data item, whereas an intermediate tier that includes both a directory file and a flat file stored in a cold tier node (without a directory file being cached in a warm tier node) may require a first access to a cold tier node to locate an offset range for a requested data item from the directory file and a second access to the cold tier node to retrieve the data item at the particular offset in the flat file.

Also, in some embodiments, both a directory file and a flat file may be cached in a cache storage of a warm tier node. Storing the data items in the flat files may improve performance of the warm tier by reducing a quantity of data items stored directly in the warm tier (e.g. a No-SQL table), while also providing lower access latencies than flat files stored remotely, for example in a separately managed object-based storage system.

Typically, the warm tier may offer data access with lower latency than the intermediate tiers and the cold tier. Due to the differing cost and performance characteristics of the tiers, the warm tier may be used to store more frequently accessed data and may be referred to as a "primary" tier, while intermediate tiers and the cold tier may be used to store less frequently accessed data (typically in larger quantities). The data store and its constituent tiers may offer multi-tenancy to clients, e.g., clients of a provider network.

Accordingly, the data store may also be referred to as a multi-tenant data store. In some embodiments, the data store and its constituent tiers may offer dynamic sizing to clients such that the available capacity for a particular client's storage needs may be increased dynamically, e.g., using storage resources from a provider network. The data store may include any suitable number and configuration of storage tiers implemented using any suitable storage subsystems and/or storage services. In one embodiment, the type, number, and/or configuration of the different storage tiers may be configured by a client of the data store. Additionally, policies for using the various tiers (e.g., policies for deciding which tier to use for storing a particular data item) may be configured by a client of the data store, for example via a client selected or specified service level agreement (SLA).

The various tiers of a data store may store data items on behalf of a plurality of clients (also referred to herein as tenants, customers, or clients). The data items may be structured differently in different tiers. For example, in the warm tier, the data items may include key-value pairs (also referred to herein as "key-value data items") and associated metadata, and the key-value pairs may be organized into data structures referred to as data scopes or tables. The data items (e.g., key-value pairs) and/or data structures that contain them (e.g., data scopes or tables) may be specific to particular clients, such that a particular data item or data structure may be said to belong to a particular client or to be owned by a particular client. The client that owns particular data items may have access to read, write, or modify those data items, in some cases exclusive of other clients. As another example, in the intermediate tiers and the cold tier, the data items may be structured as objects and stored in secure, durable, highly scalable object storage in storage locations referred to as "buckets." A storage service object, for example, may include data, a key, and metadata; the object key (or key name, or identifier) which uniquely identifies the key-addressable object in a bucket, and an index of such keys (e.g. a directory file). In some embodiments, a single storage service object stored in the cold tier may include multiple data items in the storage object, wherein the data items are key-value pairs with associated metadata that have been relocated from the warm tier to the cold tier. In some embodiments, associated metadata may not be included or may be limited for storage objects of higher latency intermediate tiers.

In some embodiments, data items that have been relocated to an intermediate tier or cold tier may be stored as data objects (e.g. flat files) that are stored locally on a same node that implements the warm tier or may be stored on another local node local to one or more nodes that implement the warm tier. Additionally, data items that have been relocated to an intermediate tier or cold tier may be stored remotely on one or more nodes that are remote from one or more nodes that implement the warm tier. Additionally, data items that have been relocated to an intermediate tier or cold tier may be stored as data objects stored remotely while a directory for data items included in the data objects are cached at a local node, such as a node that implements the warm tier or a node local to the node that implements the warm tier.

In some embodiments, clients may use client devices to perform or request suitable operations for reading, writing, or modifying data items in a data store. The data store may expose a client interface to enable clients to participate in such operations. In some embodiments, a client interface may represent a single, unified interface to all the tiers (e.g., the warm tier, cold tier, and/or the secure tier(s)). The client interface may include any suitable user and/or programmatic interfaces, such as application programming interfaces (API) enabling operations such as "put" and "get." In some embodiments, the client interface may be implemented as part of a routing interface of a tiering service, or a routing interface of a tiering service may receive requests from a client interface of a data store, locate requested data items and return the requested data items to the client interface of the data store.

In some embodiments, the tiers of a data store may be provided using one or more storage-related services, such as a relational database service, a non-relational or NoSQL database service, an object storage service that allows clients to store arbitrary amounts of data in the form of objects, a storage service that provides an elastic file system, and so on. A client of such a storage-related service may programmatically request the establishment of a portion of a data store, such as an instance of a (relational or non-relational) database that can be used for numerous database tables or data scopes and associated metadata such as indexes and the like. In the case of an object storage service, at least a portion of a data store may include a collection of objects. In the case of a storage service providing block-device interfaces, the corresponding tier of the data store may be implemented using one or more volumes.

Generally speaking, the term "data store," as used herein, may refer to a collection of one or more data items and/or data objects and associated metadata set up on behalf of one or more clients. After a data store has been created, a client may start populating various data items within the data store, e.g., using requests for operations such as "create object," "update object," "insert object," "delete object," or other similar requests at various granularity levels depending on the data store type. For example, in the case of a database, operations such as creates, updates, and deletes may be supported at the table level, the data item level, and for various metadata objects such as indexes, views, and the like. Clients may also issue read requests of various kinds, such as queries in the case of database objects.

As one skilled in the art will appreciate in light of this disclosure, certain embodiments may be capable of achieving certain advantages, including some or all of the following: lowering the latency or requests for data items stored in the intermediate tiers as compared to a cold tier, providing a user interface that lets custom configuration of a multi-tiered intermediate and cold tier data store, wherein target request latencies can be defined based on data attributes and/or age, implementing multiple intermediate cold storage tiers using a common storage server or system, such as an object-based storage service, and/or various other advantages.

Illustrative System Configuration

FIG. 1 illustrates a data store comprising a warm tier, a plurality of intermediate tiers, and a cold tier; and a tiering service that automatically promotes or demotes data items amongst the warm tier, the plurality of intermediate tiers, and the cold tier, according to some embodiments.

Storage system 100 includes data store 102 and tiering service 150. Data store 102 includes primary (warm tier) 104, first intermediate tier 106, second intermediate tier 108, any number of additional intermediate tiers 110, and cold tier 112. Primary (warm) tier 104 has a lower access latency for data items than the intermediate tiers 106, 108, and 110 and the cold tier 112. Additionally, the intermediate tiers have progressively increasing access latencies for data items between the access latency of the primary (warm) tier 104 and the access latency of the cold tier 112. As discussed in more detail in FIGS. 5-10 primary tier 104, intermediate tiers 106, 108, and 110, and cold tier 112 may be implemented on nodes of one or more storage systems that implement a data store, such as data store 102. For example, nodes of an object-based storage system, such as object-based storage system 508, or nodes of an elastic file system, such as elastic file system 602, illustrated in FIGS. 5-10, may be used to implement the intermediate tiers 106, 108, and 110, and cold tier 112. Also, the primary (warm) tier 104 may be implemented via a primary node system, such as primary node system 502, illustrated in FIGS. 5-10.

In some embodiments, a data store, such as data store 102, may include a client interface that includes or interacts with a routing manager, such as routing manager 172 of routing interface 170. In some embodiments, a client may submit data operation requests such as "get", "put", "modify", etc. via a client interface and a routing manager, such as routing manager 172, may route the requests to the appropriate tier, such as the primary tier 104, the intermediate tiers 106, 108, or 110, or the cold tier 112.

Figure 2A:
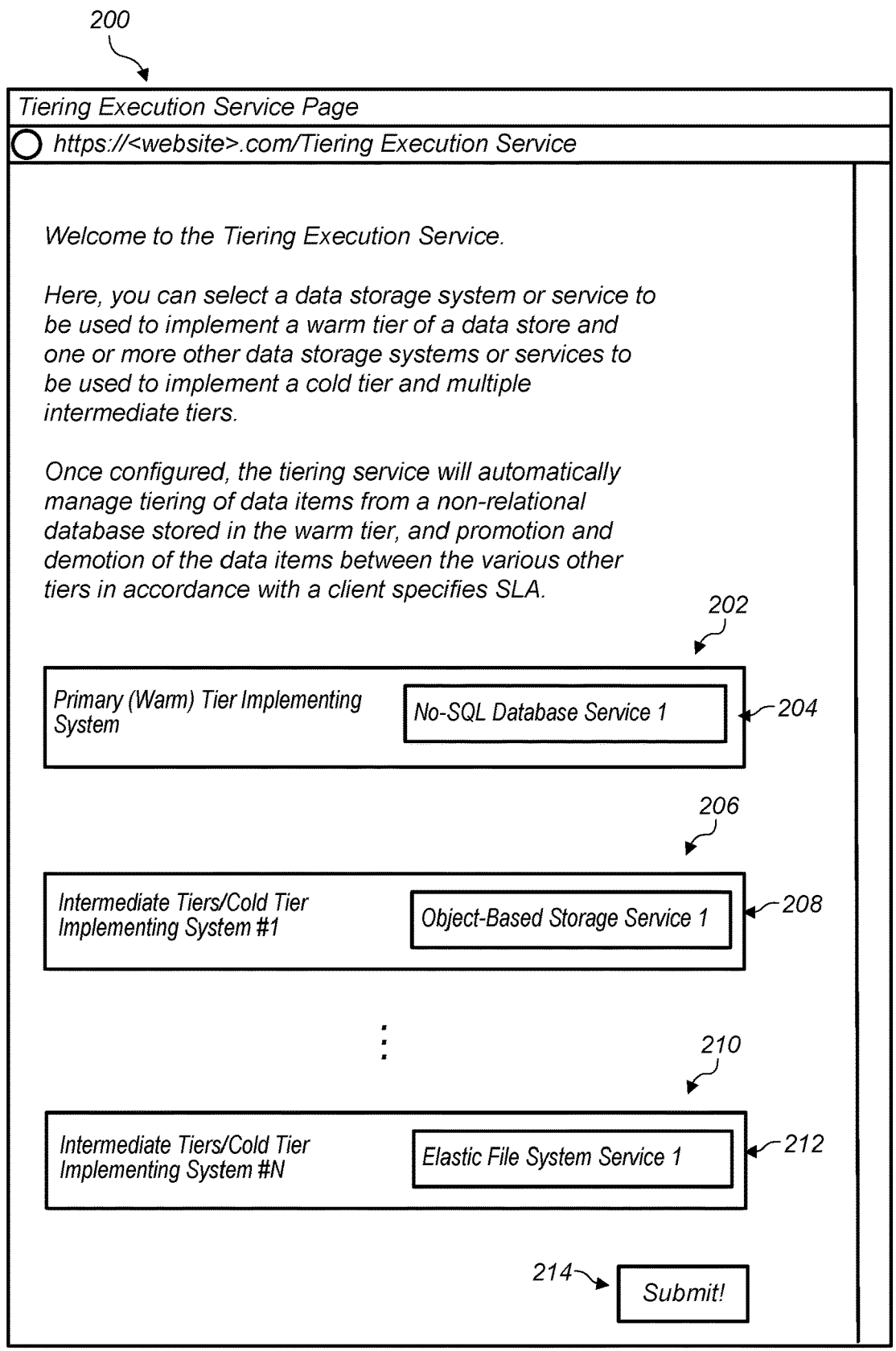
FIG. 2A illustrates an example client interface to the tiering service that enables a client to select storage resources to be used to implement a warm tier, a plurality of intermediate tiers, and a cold tier, according to some embodiments.

Storage system 100 also includes tiering service 150. Tiering service 150 includes tiering execution engine 152, service interface 156, and routing interface 170. Service interface 156 provides an interface to clients of the tiering service 150 that lets the clients configure storage systems or storage services to be used to implement the primary tier 104, the intermediate tiers 106, 108, or 110, and/or the cold tier 112. For example, service interface 156 includes tier implementation system/service selection module 168. Tier implementation system/service selection module 168 may be implemented as an application programmatic interface (API), web-based interface as illustrated in FIG. 2A, command line interface, or in another manner.

Additionally, service interface 156 includes tiering service level agreement (SLA) selection module 158. The tiering SLA selection module 158 may enable a client to specify categories of data items using various rules for identifying the data items falling into the categories, such as rules based on data item attributes, data item access patterns, data item heat (e.g. accesses per unit time), data item ages since last accessed or modified, etc. The client may also specify access latencies for data items falling into the various categories. Also, in some embodiments, a tiering service may provide hints to a client regarding categories of data items and/or data item access latency targets.

For example, a client may define a rule that requires data items for pending orders less than one month old to be accessible in less than 50 milliseconds, whereas data items for closed orders less than one month old may be accessed in up to 500 milliseconds. Also, the rules may function such that when a data items is changed from "order pending" to "order closed" the data item is automatically relocated to a different tier because the modified data item now falls into a different category (e.g. segment of data scope) that has a different corresponding latency target. In this way, a client may customize access latencies for the client's data items based on categories of data items. Moreover, the client may not be concerned with when or why a data item is relocated to a specific tier as long as the latency target for the data item of a given category is met. Therefore, the client may delegate management of data item relocations amongst the various tiers to the tiering service, while specifying latency targets for categories of data items, via the SLA.

In some embodiments, data items may skip tiers, for example the data item that was changed from "order pending" to "order closed" may be relocated from a first intermediate tier to a fifth intermediate tier, as an example, without passing through the second, third, or fourth intermediate tiers.

In some embodiments, in order to specify an SLA for a data scope, a tiering SLA selection module, such as tiering SLA selection module 158, may include an attribute segmentation criteria module 160, a time segmentation criteria module 162, attribute/time segment latency targets module 164, additional tiering criteria module 166, and/or other modules for defining rules to be included in an SLA for a data scope. For example, FIG. 2B illustrates an example web-based interface that may be used to define or select an SLA. In some embodiments, attribute segmentation criteria module 160, time segmentation criteria module 162, attribute/time segment latency target module 164, and/or additional tiering criteria module 166 may be implemented as an application programmatic interface (API), web-based interface as illustrated in FIG. 2B, command line interface, or in another manner.

For example client A 120, client B 122, or any other client such as client N 124, may submit a client tiering policy comprising an SLA for the client's data scope or database via network 118 to service interface 156. For example, client A 120 is submitting client A tiering policy 114 and client B 122 is submitting client B tiering policy 116. The various modules of the tiering SLA selection module 158, such as attribute segmentation criteria module 160, time segmentation criteria module 162, attribute/time segment latency targets module 164, and additional tiering criteria module 166, may parse the received tiering policies, received from clients, such as client A tiering policy 114 and client B tiering policy 116. The tiering SLA selection module 158 may utilize the parsed client policies to generate one or more tiering policies 154 that are executed by tiering execution service 152 to ensure that the client's specified tiering policies are being enforced and any SLA commitments made to the clients are being met.

Tiering service 150 also includes routing interface 170 for routing requests directed to data items in the various tiers to the correct storage location where the data items are located. In some embodiments, routing interface 170 includes cached bloom filters or indexes for the various segments (e.g. cached bloom filters/indexes 174). The cached bloom filters or indexes may be utilized by the routing manager 172 to locate which node of an object-based storage system includes a particular data item that is being requested.

In FIG. 1, tiering execution engine 152 and routing interface 170 are shown as separate from data store 102. However, in some embodiments, a tiering execution engine of a data store, such as data store 102, may be configured by a tiering service, such as tiering service 150, without the tiering execution engine being a separate entity separate from the data store. Likewise, in some embodiments, a tiering service, such as tiering service 150, may configure a routing interface and/or routing manager of a data store, such as data store 102, without the routing interface or routing manager being a separate entity separate from the data store. For example, in some embodiments, routing interface 170 and/or routing manager 172 may be included in data store 102.

System 100 as illustrated in FIG. 1 includes data store 102, but may also include additional services. For example, in some embodiments, system 100 may be a provider network that includes additional computing, storage, or networking resources or other services offered to clients in addition to services associated with data store 102.

In some embodiments, warm tier 104 may be a database system and the intermediate tiers 106, 108, 110 and cold tier 112 may be implemented via an object-based data storage system or elastic file system. The warm tier 104 may typically be more expensive per unit of data stored and may have lower latency for data access than the cold tier 112 and the intermediate tiers 106, 108, and 110. For example, in some embodiments warm tier 104 may be configured in accordance with various database formats or protocols, such as Aerospike, ArangoDB, Couchbase, Amazon Dynamo DB, FairCom c-tree ACE, Foundation DB, HyperDex, InfinityDB, MemcacheDB, MUMPS, Oracle NoSQL Database, OrientDB, Redis, Riak, Berkley DB, Google Engine, etc. In some embodiments, cold tier 112 and the intermediate tiers 106, 108, and 110 may be implemented utilizing a lower cost storage service than is used for the warm tier 104, such as Amazon's Simple Storage Service (S3) or Amazon Glacier, as some examples.

In some embodiments, a tiering execution engine, such as tiering execution engine 152 may execute tiering of data items between a warm tier, a plurality of intermediate tiers, and a cold at defined time intervals in accordance with selected tiering policies specified by a client of a data store or a client of a client-configurable data tiering service.

In some embodiments, a tiering execution engine, such as tiering execution engine 152, may reach an execution interval for performing tiering, for example daily execution intervals or weekly execution intervals, and upon reaching the execution interval, the tiering execution engine may evaluate a client's selected tiering policies (e.g. SLAs) to determine if any of the client's tables are ripe for tiering. If so, the tiering execution service may then determine data items included in the ripe tables or scopes that are to be relocated to an intermediate tier or cold tier in accordance with the client's selected tiering policy or policies.

In some embodiments, a cold tier or an intermediate tier may be implemented using an object based storage that stores blobs of data as objects, wherein the objects are flat files without an internal hierarchy. In such embodiments, a cold tier node may include one or more flat files that store data for multiple data items that have been relocated from the warm tier to the cold tier or the plurality of intermediate tiers. The cold tier and/or the intermediate tiers may also include at least one directory that indicates where data for respective ones of the data items are stored in the one or more flat files. For example, the directory file may be organized based on data item key-values wherein the directory file includes a key-value for each data item stored in the cold tier, the intermediate tiers, or a portion thereof. The directory file may also include a corresponding pointer to a location in a flat file where data for a data item having a respective key-value is stored. In some embodiments, in order to determine an item value or meta data value for a particular data item having a particular key included in the directory file, it may be necessary to locate the key for the data item in the directory file and then locate data for the data item stored in one of the flat files at a location indicated in the directory file in order to determine an item-value or metadata value for the data item having the particular key-value. In some embodiments, directory files may be omitted for higher latency tiers, and locating a data item may require building a view of a flat file, on-demand, in order to locate the data item.

Example Interfaces for a Tiering Service

FIG. 2A illustrates an example client interface to the tiering service that enables a client to select storage resources to be used to implement a warm tier, a plurality of intermediate tiers, and a cold tier, according to some embodiments.

Interface 200 includes a selection box 202, wherein a client of a tiering service, such as tiering service 150, can indicate a storage system to be used as a warm tier, or an existing database for which tiering is to be applied. For example, the client has selected No-SQL Database Service 1 (204) as the primary (warm) tier implementing system.

Interface 200 also includes multiple intermediate tier/cold tier selection boxes 206 and 208. A client may select one or more additional storage services, such as an object-based storage service or an elastic file system storage service, to be used to implement the intermediate tiers and/or cold tiers. As previously discussed, multiple intermediate tiers may be implemented on a common data storage system, such as a common object-based storage system, such as Amazon's S3 object-based storage service. For example, the client has selected Object-Based Storage Service 1 (208) and Elastic File System Service 1 (212) as storage systems or services to be used to implement the intermediate tiers and/or cold tier.

After making the appropriate selections, a client may click submit button 214, to cause the tiering service to automatically implement the intermediate tiers and the cold tier using the selected storage systems or storage services. In some embodiments, the client may additionally specify a service level agreement (SLA) via an additional interface as shown in FIG. 2B prior to the tiering service automatically implementing the intermediate tiers and the cold tier.

For example, FIG. 2B illustrates an example client interface to the tiering service that enables a client to specify a service level agreement (SLA) for various client-defined data segments of a data scope to be tiered by the tiering service, according to some embodiments.

Interface 250 includes multiple data category/data attribute fields 254, 256, and 258, wherein a client may specify various rules for identifying data items falling into different categories, such as rules based on data item attributes, data item access patterns, data item heat (e.g. accesses per unit time), etc. Additionally, interface 250 includes multiple age range fields 260, 264, and 270 wherein a client may specify age-ranges that are to be used to further segment (e.g. vertically segment) horizontal segments determined based on the rules included in the data category/data attribute fields 254, 256, and/or 258. For example, for data items with a delivery status of "delivered" the data items may further be segmented based on age since last modified or accessed into sub-segments corresponding to 0-1 days, 1-7 days, and 7-30 days.

Additionally, interface 250 includes latency target fields 262, 266, and 272, wherein a client may assign access latency targets for data items falling within a segment or sub-segment corresponding to the latency target fields. For example, data items with an order status of "delivered" that are less than one day old, may be guaranteed to be accessible within 50 milliseconds, whereas data items with an order status of "delivered" that are 1-7 days old may be guaranteed to be accessible within 500 milliseconds.

Note that in some embodiments, the clients may enter various latency targets that may not necessarily align with latency thresholds for all of the various intermediate tiers. In some embodiments, the tiering execution service may not implement all the intermediate tiers described herein, or may alter metadata strategies to meet the client's requested latency targets. Also, the tiering service may monitor latency performance and learn tiering rules to ensure the client's requested latency targets are met.

After filling out the various fields of the interface 250, the client may select submit button 278 to cause the tiering service to begin automatically and dynamically promoting and demoting data items between the warm tier, the plurality of intermediate tiers, and the cold tier in accordance with the service level agreement (SLA) specified by the client via interface 250.

Note that interface 250, is given as an example and should not be considered as limiting. In some embodiments, various other fields or organizations of fields may be used to enable a client to specify a custom SLA for the client's data scope. Additionally, in some embodiments, a client may specify a custom SLA via an API, command line interface, or using various other interfaces to the tiering service.

Example Latency Profiles

Figure 3A:
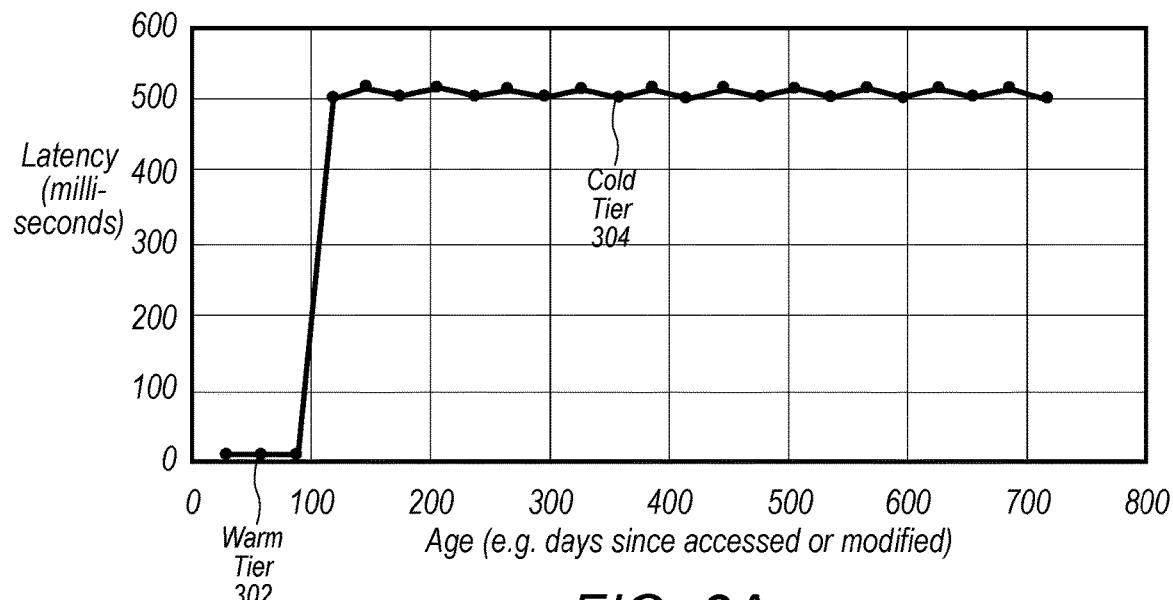
FIG. 3A illustrates an example latency profile over time of a data item stored in a data store comprising a single warm tier and a single cold tier.

FIG. 3A illustrates an example latency profile over time of a data item stored in a data store comprising a single warm tier and a single cold tier.

As previously discussed, in systems with a single cold tier or a limited number of cold tiers, relocation of pieces of data to the lower cost cold tier storage may cause a large jump in the latency for accessing the pieces of data that have been relocated to the cold tier. For some clients of a distributed system, such a large jump in latency may negatively impact the client's operations and performance. For example, warm tier 302 has a relatively low latency of 50 millisecond, but after 90 days the latency jumps considerably to 500 milliseconds when data items are relocated to cold tier 304. For some clients, 50 millisecond may be faster than what is required to meet the client's objectives, but 500 milliseconds may be too slow to meet the client's objectives. Thus, the client may opt out of tiering data to the cold tier, resulting in inefficient use of the warm tier resources, or may suffer less than optimal performance for data items relocated to the cold tier 304.

In contrast, using a tiering service, such as tiering service 150, a client may specify custom latency targets that meet the client's needs along with data segmentation rules, such that data items are not retained in the warm tier longer than needed to meet the client's objectives and data items relocated to the intermediate tiers or cold tier have performance characteristics that meet the client's objectives.

Figure 3B:
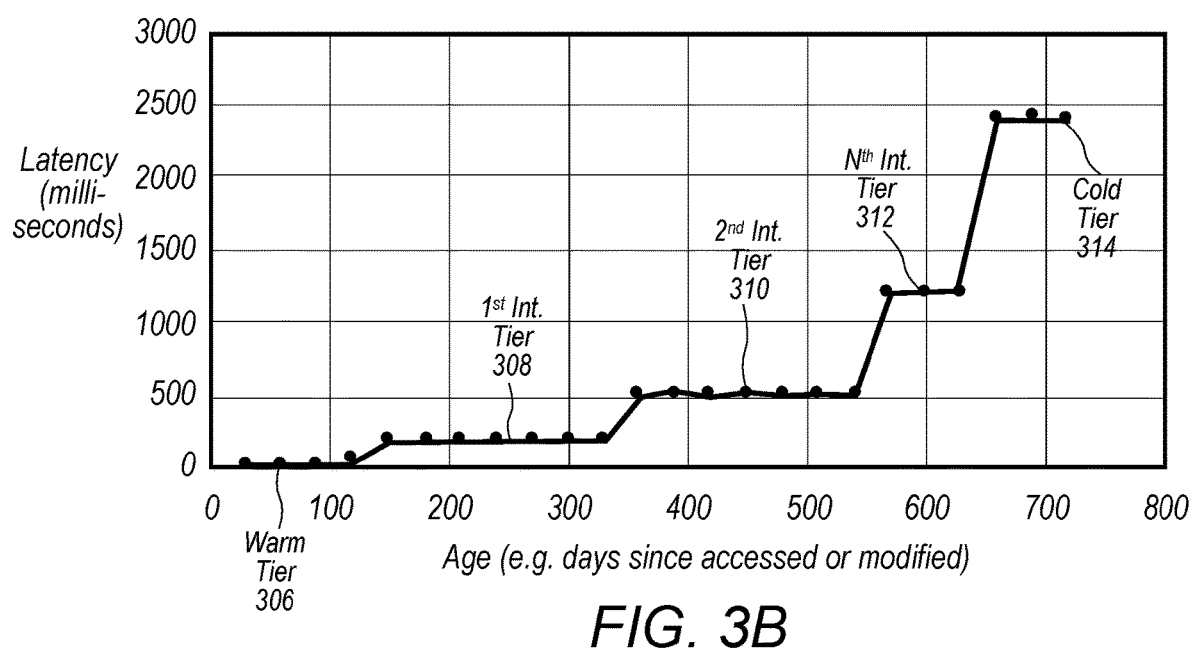
FIG. 3B illustrates an example latency profile over time of a data item stored in a data store comprising a warm tier, a plurality of intermediate tiers, and a cold tier, according to some embodiments.

For example, FIG. 3B illustrates an example latency profile over time of a data item stored in a data store comprising a warm tier, a plurality of intermediate tiers, and a cold tier, according to some embodiments.

Data items may initially be in a warm tier 306, which may be the same warm tier as warm tier 302, but the data tiering service may demote the data items amongst a plurality of intermediate tiers to meet the client's customized latency requirements defined via an SLA, such as one submitted via interface 250. For example, as a data item ages, the data item may be relocated to intermediate tiers 308, 310, 312, and cold tier 314 that have progressively higher latencies. The data items may be relocated based on criteria defined in the SLA, and not necessarily based on pre-defined time thresholds. For example, two data items of the same age may be relocated to different tiers based on different attributes of the data items or other characteristics relating to the data items that are different.

Example Data Item Segmentation

Figure 4A:
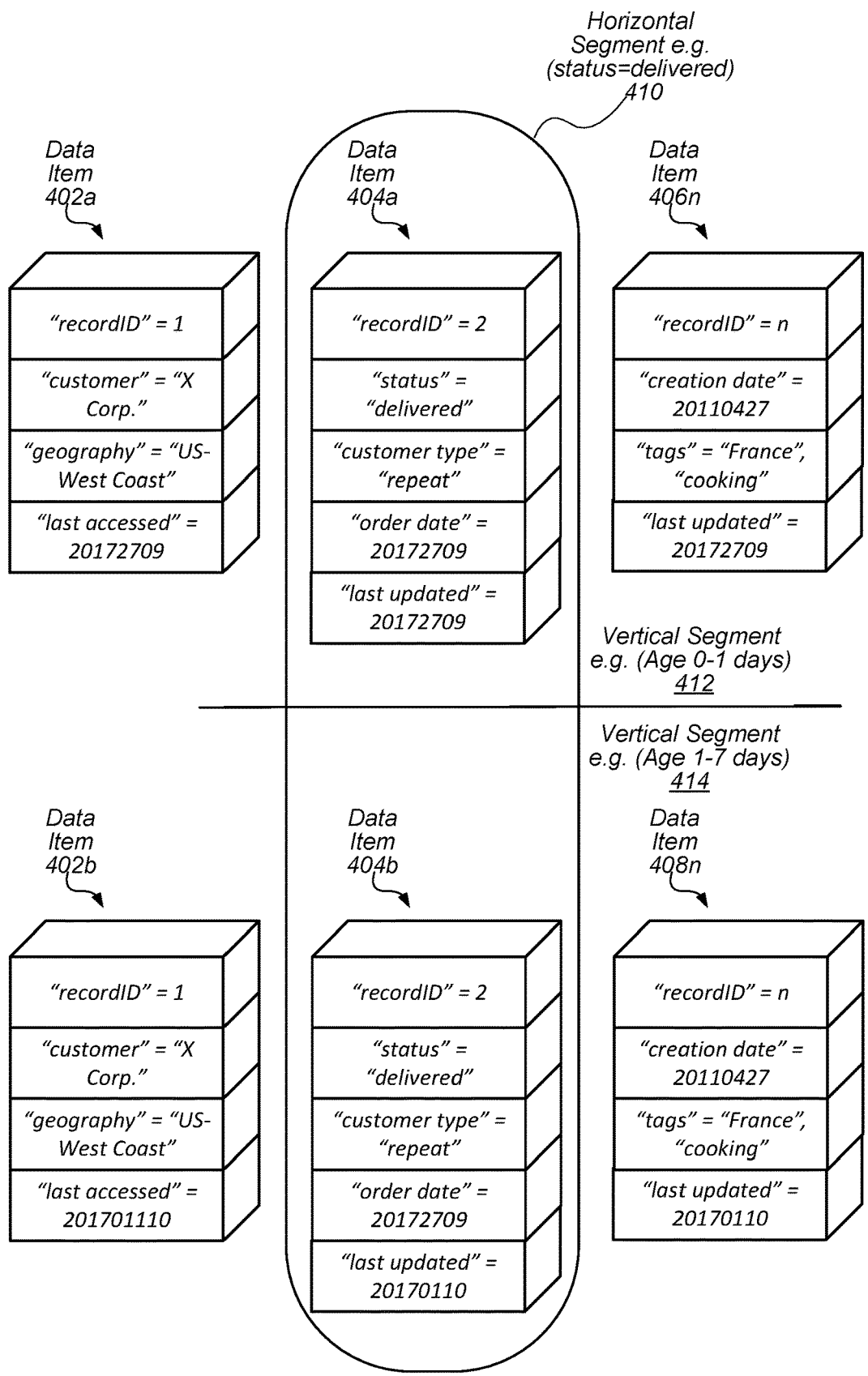
FIG. 4A illustrates example key-value data items that may be stored in a data store and how the key-value data items may be segmented for relocation to intermediate tiers or a cold tier in accordance with a client specified service level agreement (SLA), according to some embodiments.
Figure 4B:
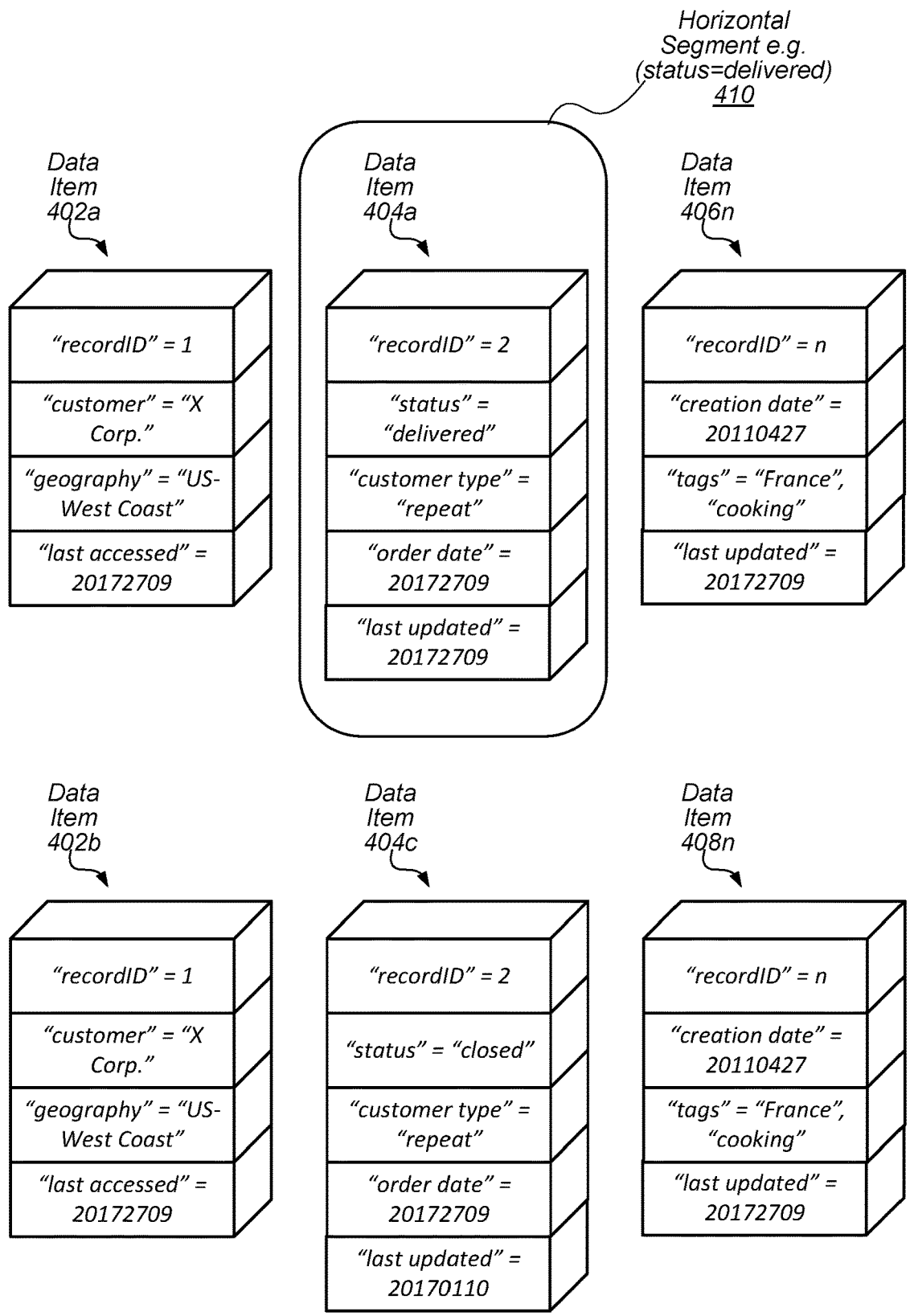
FIG. 4B illustrates example key-value data items that may be stored in a data store and how the key-value data items may be segmented for relocation to intermediate tiers or a cold tier in accordance with a client specified service level agreement (SLA), according to some embodiments.

FIGS. 4A-4B illustrate example key-value data items that may be stored in a data store and how the key-value data items may be segmented for relocation to intermediate tiers or a cold tier in accordance with a client specified service level agreement (SLA), according to some embodiments.

In some embodiments, each of a plurality of data scopes (e.g. tables) may store a plurality of data items. As illustrated in FIGS. 4A-4B, each of the data items stored in a data scope (e.g. table) may include a plurality of attributes, and each of the attributes may include an attribute name and a scalar or set type value. In this example, item 402a includes a numeric "recordID" attribute whose value is 1, a string "customer" attribute whose value is "X Corp.", a string attribute named "geography" whose value is "US-West Coast", and a numeric attribute named "last accessed" whose value is 20172709. In this example, item 404a includes a numeric "recordID" attribute whose value is 2, a string attribute named "status" whose value is set to "delivered", a string attribute named "customer type" whose value is set to "repeat", a numeric attribute named "order date" whose value is 20172709, and a numeric attribute named "last updated" whose value is 210172709. In this example, item 406n includes a numeric "recordID" attribute whose value is n, a numeric "creation date" attribute whose value is 20110427, and a string attribute named "tags" whose value is the set to containing the strings "France" and "cooking". Additionally, item 406n includes a numeric attribute named "last updated" whose value is set to 20172709. In some embodiments, items 402a, 402b, and 406n are all stored in the same table even though they do not all include the same set of attributes. Instead, each item includes a sparse set of attributes from among all the attributes that have been specified for the collection of items stored in a given table. In some embodiments, tables such as those described herein may be used to store and manage system metadata in addition to user data.

Data items 402b, 404b, and 408n include similar attributes as data items 402a, 404a, and 406n. Except the data items 402b, 404b, and 408n have a later in time last update value of 201701110.

In some embodiments, a table maintained by a data storage service on behalf of a client/user may have a primary key that identifies its items. The primary key may be defined over one attribute (and may be single valued) or over several attributes (i.e. it may be a composite primary key), in various embodiments. The key attributes may be immutable, may have a fixed type, and may be mandatory for every item, as they uniquely identify an item within a data scope or table.

As an illustration of horizontal segmentation and vertical segmentation, a client may have specified a segmentation criteria in an SLA, for example via interface 250, regarding data items that include the data item attribute "delivered." Thus, data items 404a and 404b may be included in a common horizontal segment. The client may further have specified that data items with the data attribute "delivered" are to be further vertically segmented based on age of the data items, wherein data items that are less than one day old are included in a data segment with a first latency target, and data items that are between 1-7 days old are included in another data segment with a second latency target. Thus, data items 404a and 404b may be included in the same horizontal segment 410 but may be included in different vertical segments of the horizontal segment 410, e.g. vertical segments 412 and 414.

However, in FIG. 4B the status of data item 404c has been changed to "closed" such that it is no longer included in horizontal segment 410. In this way a different latency target may be applied to data item 404c in response to the change in the data attribute of data item 404c, even though it has the same age as data item 404b.

Example Intermediate Tier Implementations

FIGS. 5-10 illustrate a more detailed view of a data store, such as data store 102 illustrated in FIG. 1, and show multiple intermediate tier and cold tier configurations may be implemented, according to some embodiments.

Figure 5:
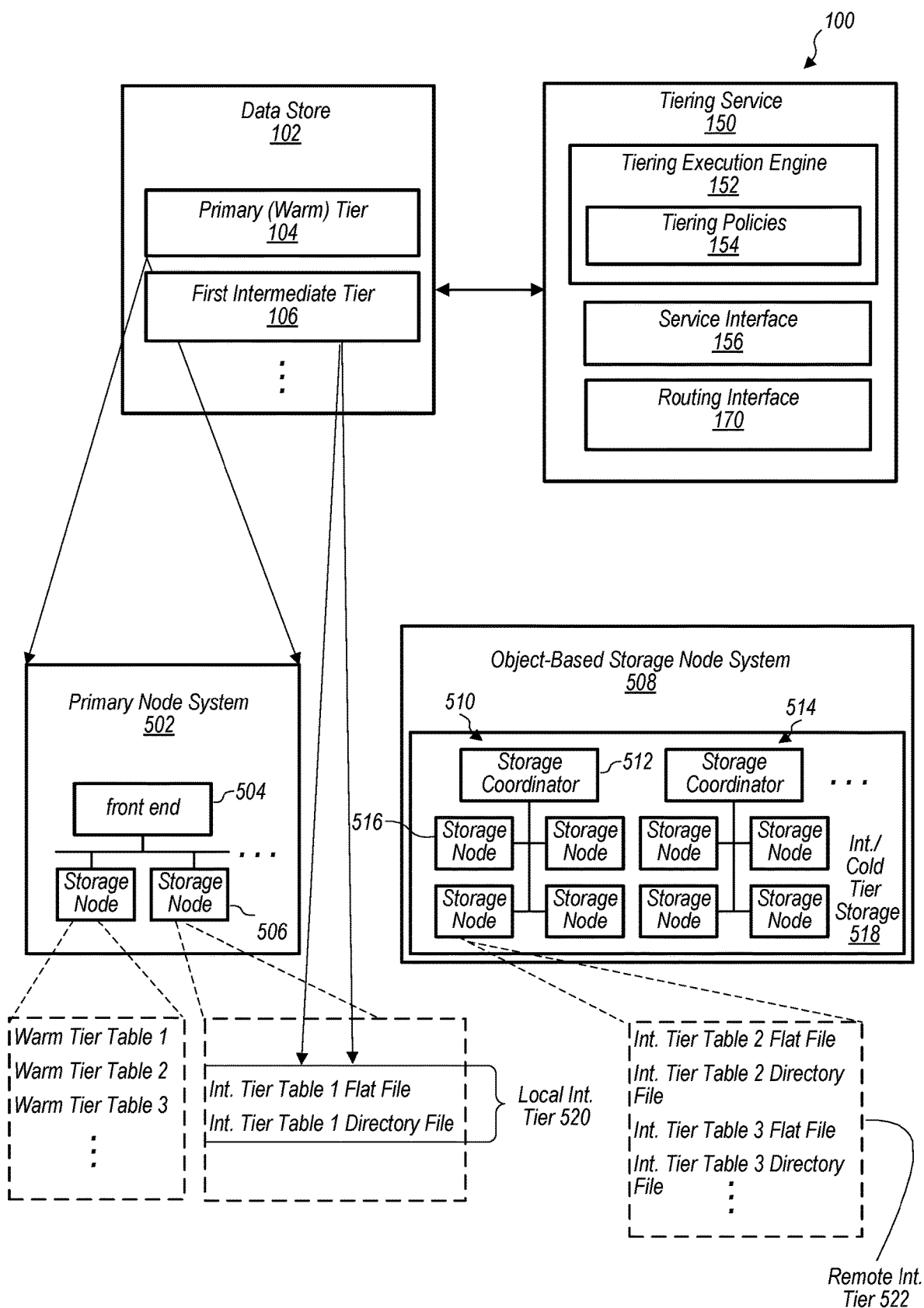
FIG. 5 illustrates an example implementation of a first intermediate tier, according to some embodiments.

FIG. 5 illustrates a detailed view of an example primary node system 502 that illustrates at least one possible configuration for warm tier 104 according to at least some embodiments. It is noted that where one or more instances of a given component may exist, reference to that component herein below may be made in either the singular or the plural. However, usage of either form is not intended to preclude the other. In various embodiments, the components illustrated in primary node system 502 may be implemented directly within computer hardware, as instructions directly or indirectly executable by computer hardware (e.g., a microprocessor or computer system), or using a combination of these techniques. For example, the components of primary node system 502 may be implemented by a distributed system including a number of computing nodes (or simply, nodes), such as the computer node embodiment illustrated in FIG. 17 and discussed below. In various embodiments, the functionality of a given storage service system component of a warm tier or cold tier may be implemented by a particular computing node or may be distributed across several computing nodes. In some embodiments, a given computing node may implement the functionality of more than one storage service system component of a warm tier, intermediate tiers, or cold tier.

Generally speaking, storage service clients may encompass any type of client configurable to submit web services requests to primary node system 502 via a network. For example, a given storage service client may include a suitable version of a web browser, or a plugin module or other type of code module configured to execute as an extension to or within an execution environment provided by a web browser to provide storage service clients (e.g., client applications, users, and/or subscribers) access to the data storage services provided by primary node system 502. Alternatively, a storage service client may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, a storage service client may be an application configured to interact directly with data store 102. In various embodiments, storage service client may be configured to generate web services requests according to a Representational State Transfer (REST)-style web services architecture, a document- or message-based web services architecture, or another suitable web services architecture.

Generally speaking, data store 102 may be configured to implement one or more service endpoints configured to receive and process web services requests, such as requests to access tables maintained on behalf of clients/users by a data storage service, and/or the items and attributes stored in those tables. For example, data store 102 may include hardware and/or software configured to implement various service endpoints and to properly receive and process HTTP-based web services requests directed to those endpoints. In one embodiment, primary node system 502 may be implemented as a server system configured to receive web services requests from clients via a client interface and to forward them to various components that collectively implement a data storage system for processing. In other embodiments, primary node system 502 may be configured as a number of distinct systems (e.g., in a cluster topology) implementing load balancing and other request management features configured to dynamically manage large-scale web services request processing loads.

As illustrated in FIGS. 5-10, primary node system 502 may include a front end 504 (which may be configured to receive, authenticate, parse, throttle and/or dispatch service requests, among other things), one or more administrative components, or auto admin instances (not shown), (which may be configured to provide a variety of visibility and/or control functions), and a plurality of storage node instances (shown as storage nodes 506), each of which may maintain and manage one or more tables on behalf of clients/users or on behalf of the data storage service (and its underlying system) itself.

In addition to functioning as an addressable endpoint for clients' web services requests, in some embodiments, primary node system 502 may implement various client management features. For example, primary node system 502 may coordinate the metering and accounting of client usage of web services, including storage resources, such as by tracking the identities of requesting clients, the number and/or frequency of client requests, the size of tables and/or items stored or retrieved on behalf of clients, overall storage bandwidth used by clients, class of storage requested by clients, and/or any other measurable client usage parameter.

FIGS. 5-10 also illustrate a detailed view of an example hardware implementation of object-based storage node system 508 that illustrates at least one possible configuration for nodes that implement the intermediate tiers 106, 108, 110, and cold tier 112, according to at least some embodiments.

Figure 8:
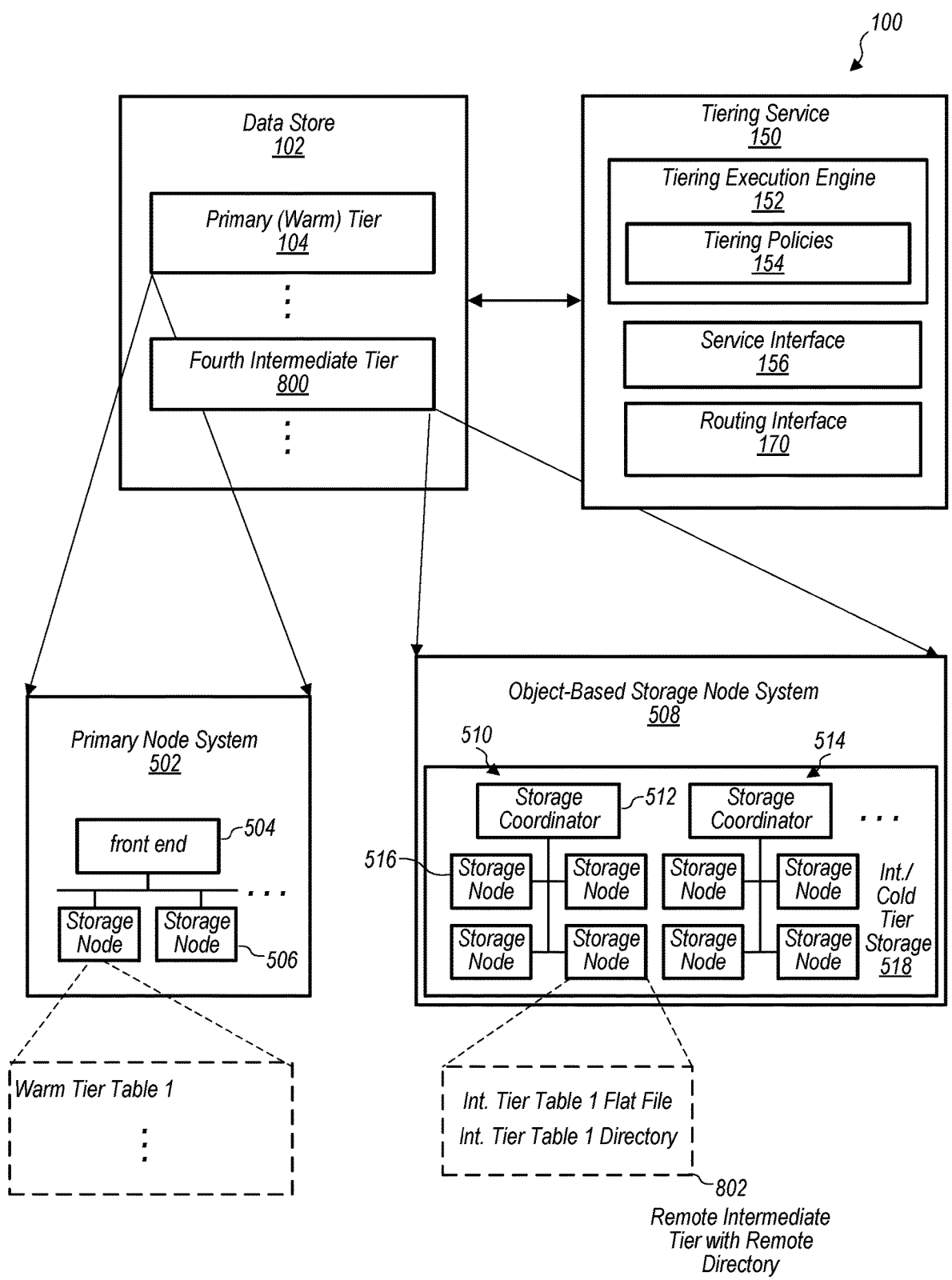
FIG. 8 illustrates an example implementation of a fourth intermediate tier, according to some embodiments.
Figure 9:
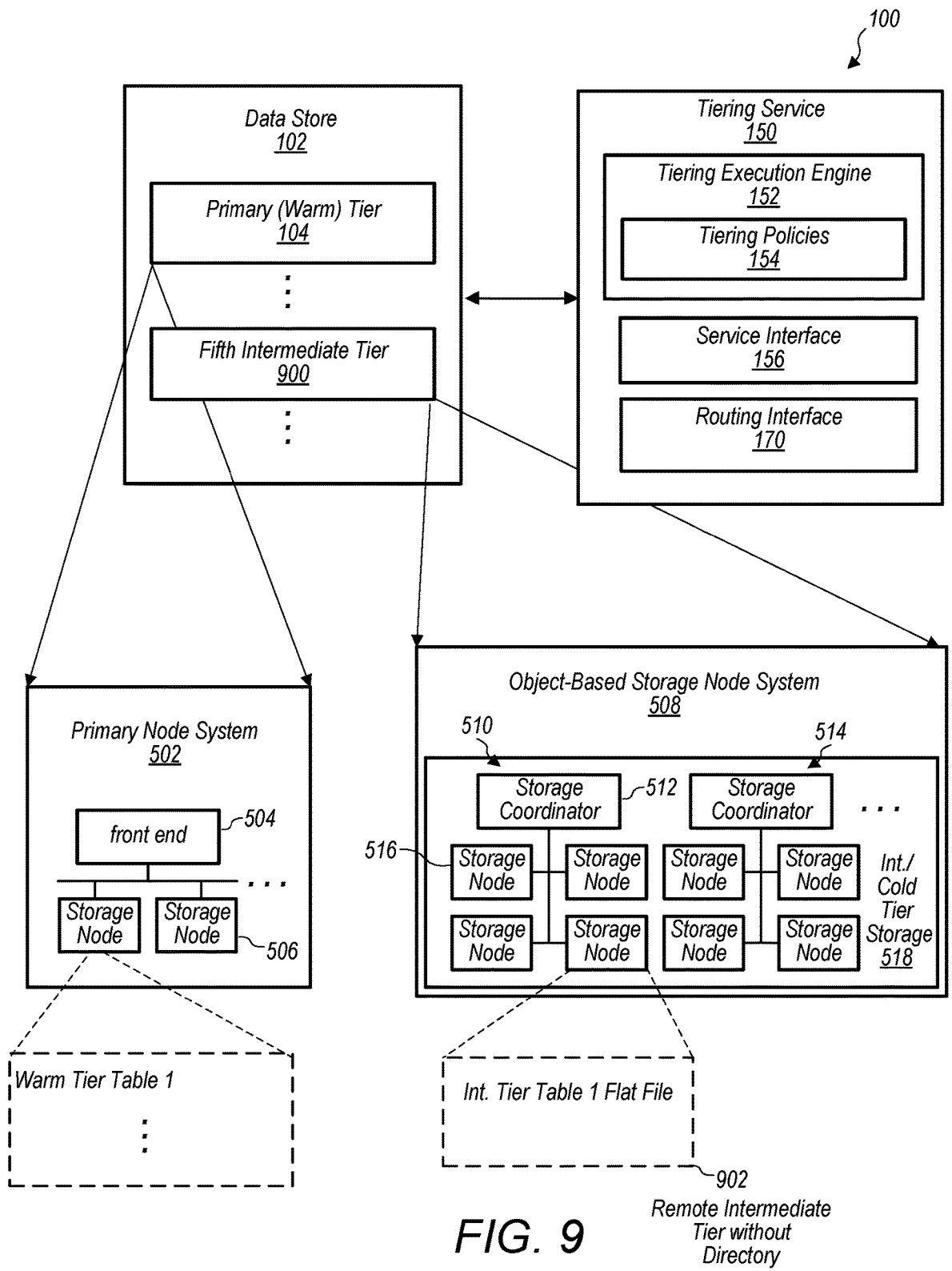
FIG. 9 illustrates an example implementation of a fifth intermediate tier, according to some embodiments.
Figure 10:
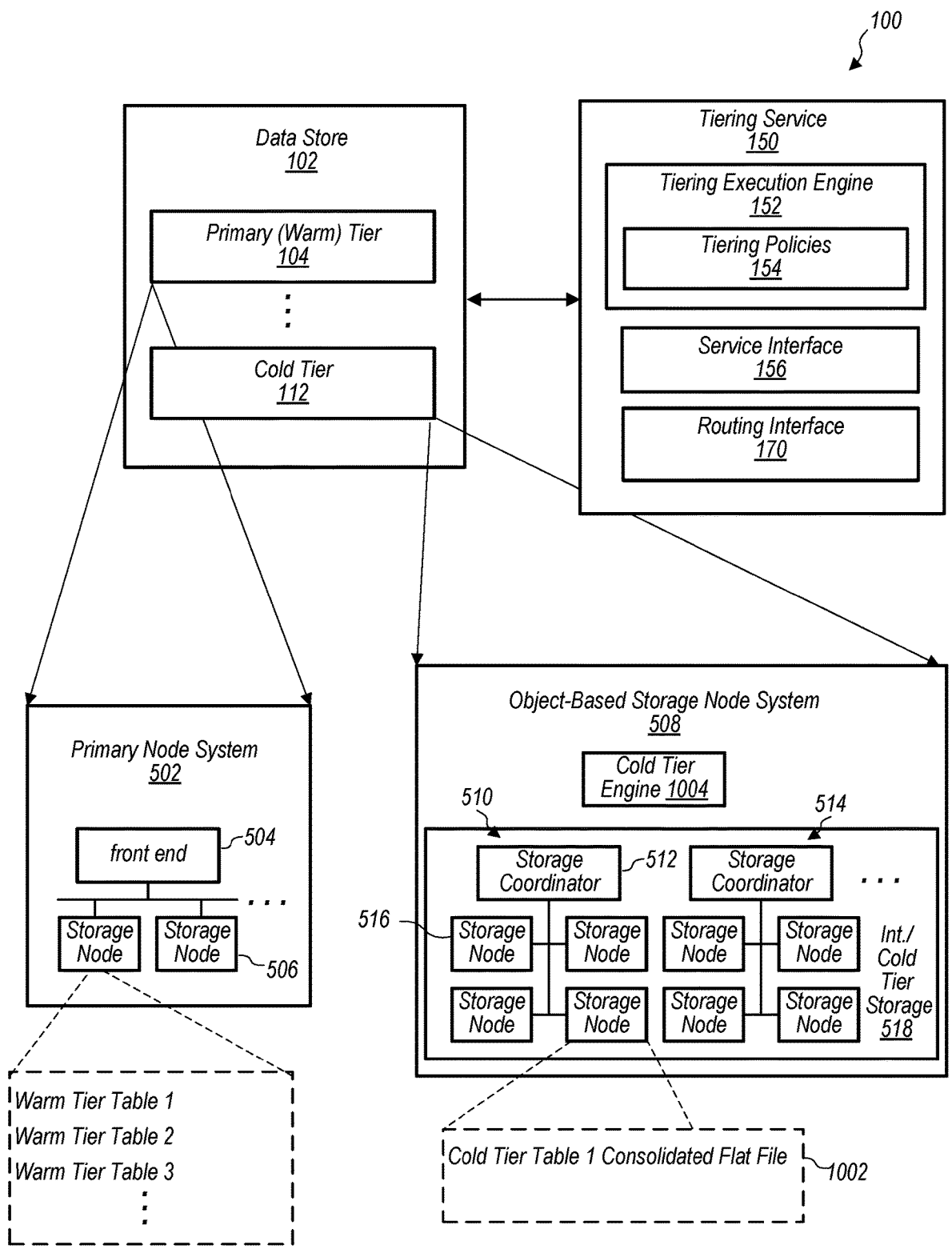
FIG. 10 illustrates an example implementation of a cold tier, according to some embodiments.

In the illustrated embodiment shown in FIGS. 5-10, object-based storage node system 508 includes a cold tier storage 518 and in some embodiments may include a cold tier engine 1004 (illustrated in FIG. 10). Note that a cold tier engine may be implemented in a primary node system 502 or may be implemented in an object-based storage node system, such as object-based storage node system 508 (not illustrated in this configuration). The object-based storage node system 508 is shown including two areas 510 and 514. Each of areas 510 and 514 includes a respective coordinator instance 512. Areas 510 and 514 may also include various combinations of storage nodes 516, wherein at least one of the storage nodes is a keymap instance.

In one embodiment each of areas 510 and 514 may be considered a locus of independent or weakly correlated failure. That is, the probability of any given area experiencing a failure may be generally independent from or uncorrelated with the probability of failure of any other given area, or the correlation of failure probability may be less than a threshold amount.

Areas 510 and 514 may include additional levels of hierarchy (not shown). Additionally, different object-based storage node system components may communicate according to any suitable type of communication protocol. For example, where certain object-based storage node components are implemented as discrete applications or executable processes, they may communicate with one another using standard interprocess communication techniques that may be provided by an operating system or platform (e.g., remote procedure calls, queues, mailboxes, sockets, etc.), or by using standard or proprietary platform-independent communication protocols. Such protocols may include stateful or stateless protocols that may support arbitrary levels of handshaking/acknowledgement, error detection and correction, or other communication features as may be required or desired for the communicating cold tier components. For example, in one object-based storage node system embodiment, a substantial degree of inter-component communication may be implemented using a suitable Internet transport layer protocol, such as a version of Transmission Control Protocol (TCP), User Datagram Protocol (UDP) or a similar standard or proprietary transport protocol. However, it is also contemplated that communications among object based storage node system components may be implemented using protocols at higher layers of protocol abstraction.

In some embodiments, data items stored in an intermediate tier or cold tier, such as intermediate tiers 106, 108, 110, or cold tier 112, may be structured as objects and stored in secure, durable, highly scalable object storage in storage locations referred to as "buckets." For example, in embodiments in which intermediate tiers 106, 108, 110 or cold tier 112 is implemented using Amazon's S3 service, an S3 object may include data, a key, and metadata. The object key (or key name) may uniquely identify the key-addressable object in a bucket, and an index of such keys may also be maintained as a key map in at least one of the storage nodes 516.

In some embodiments, data items selected for tiering from client tables stored in a warm tier such as data items from warm tier tables 1, 2, or 3, may be included in an intermediate tier flat file such as intermediate tier table 1 flat file of local intermediate tier 520 or intermediate tier table 2 flat file of remote intermediate tier 522 stored in one of storage nodes 516 of object-based storage node system 508. In some embodiments, an intermediate tier or cold tier file may be a flat file without an internal hierarchy. The flat file may also be a write once read many times file also referred to as a read only database (RODB) file. In some embodiments, an intermediate tier may further include an intermediate tier directory file, such as intermediate tier table 1 directory file of local intermediate tier 520 or intermediate tier table 2 and table 3 directory files of remote intermediate tier 522. The intermediate tier directory file may include an ordered list of key-values for data items that have been relocated to the respective intermediate tiers and associated mappings of storage locations in the intermediate tier flat files where the corresponding data items are stored.

In some embodiments, the local intermediate tier 520 may be a first intermediate tier that has a lower latency than other ones of the intermediate tiers. In some embodiments, for most recent segments of a data scope, the most recent segments may be initially stored in the local intermediate tier that is implemented via one or more cache storages of nodes that also implement the warm tier. The segments may then be demoted in accordance with an SLA to one or more other intermediate tiers that have higher latencies than the first intermediate tier. In some embodiments, the remote intermediate tier 522, may be a fourth intermediate tier, as discussed in more detail in regard to FIG. 8.

In some embodiments, a tiering service, such as tiering service 150, may implement sliding window time slicing of data items relocated to the intermediate tiers or the cold tier, wherein a most recent time slice window (e.g. L1) may be cached in the local intermediate node 520. Eventually a new most recent time slice window (e.g. a new L1) may be cached in the local intermediate node 520, and the previous time slice window may be demoted to a higher latency intermediate tier and/or combined with other previous time slice windows into a L0 file. Sliding time slice windows are further described in FIG. 11.

Note that numerical labels, e.g. "first", "second", etc. have been used to describe the various intermediate tiers for conciseness in this description. In some embodiments, a tiering service, such as tiering service 150, may implement more or fewer intermediate tiers. For example, in some embodiments, the second intermediate tier, as described herein, may be omitted such that the third intermediate tier becomes the second intermediate tier, etc. The various numerals, e.g. first, second, etc. should be understood as providing labels for the various intermediate tiers and not necessarily limiting the intermediate tier to a particular number of tiers or a particular order of tiers.

Figure 6:
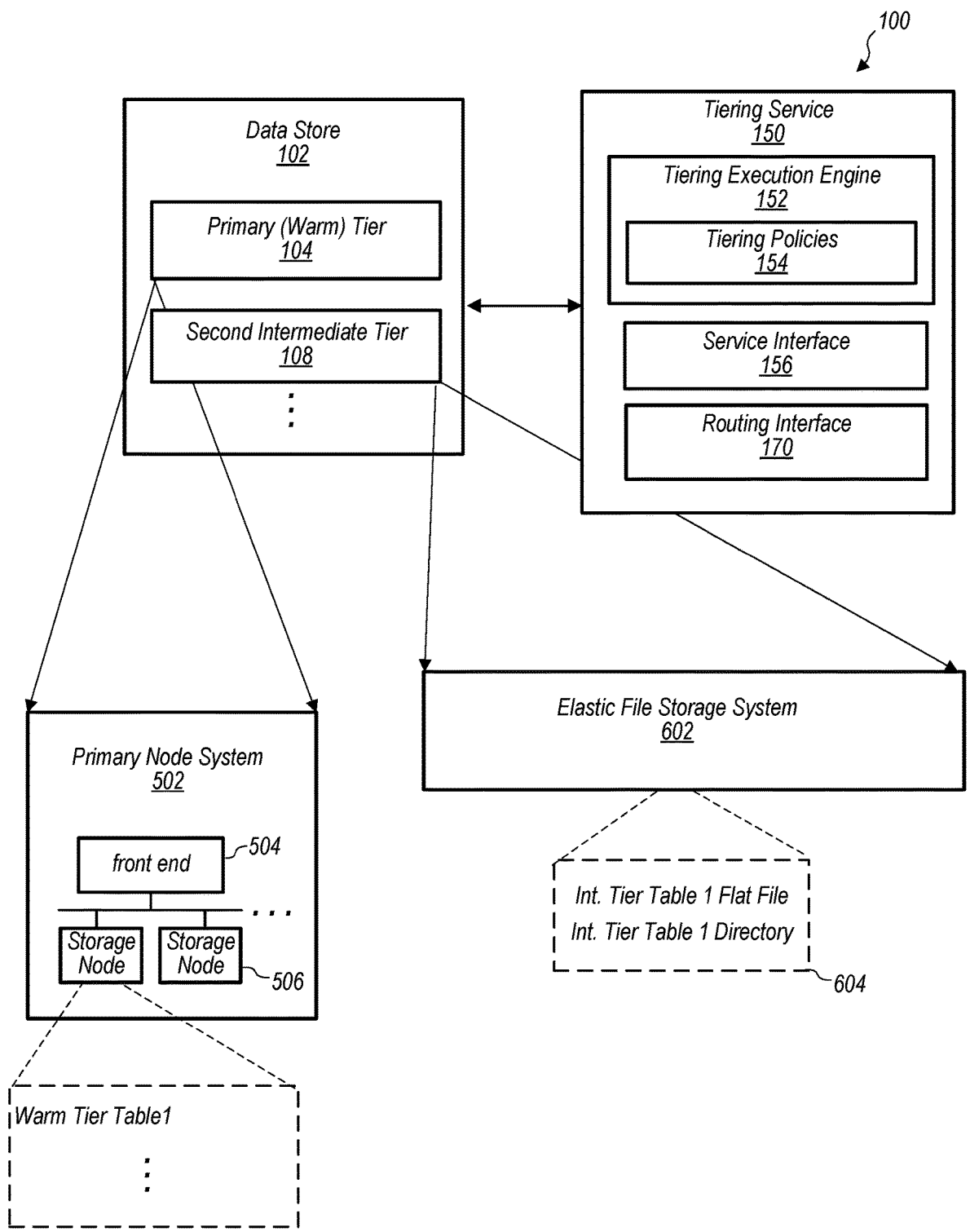
FIG. 6 illustrates an example implementation of a second intermediate tier, according to some embodiments.

FIG. 6 illustrates an example implementation of a second intermediate tier, according to some embodiments.

In some embodiments, a second intermediate tier may be implemented by storing read only database files (RODB) files in an elastic file system, such as elastic file storage system 602. For example, RODB file 604 comprising an intermediate tier table 1 flat file and an intermediate tier table 1 directory is stored in elastic file system 602. The file structure of the second intermediate tier may reduce latency of access requested, for example the file structure may act as metadata that guides a routing manager to the correct RODB file to service a given data item access request. In some embodiments, an elastic file storage system, such as elastic file storage system 602, may be a network-based storage system that is mounted on a warm tier node host.

Figure 7:
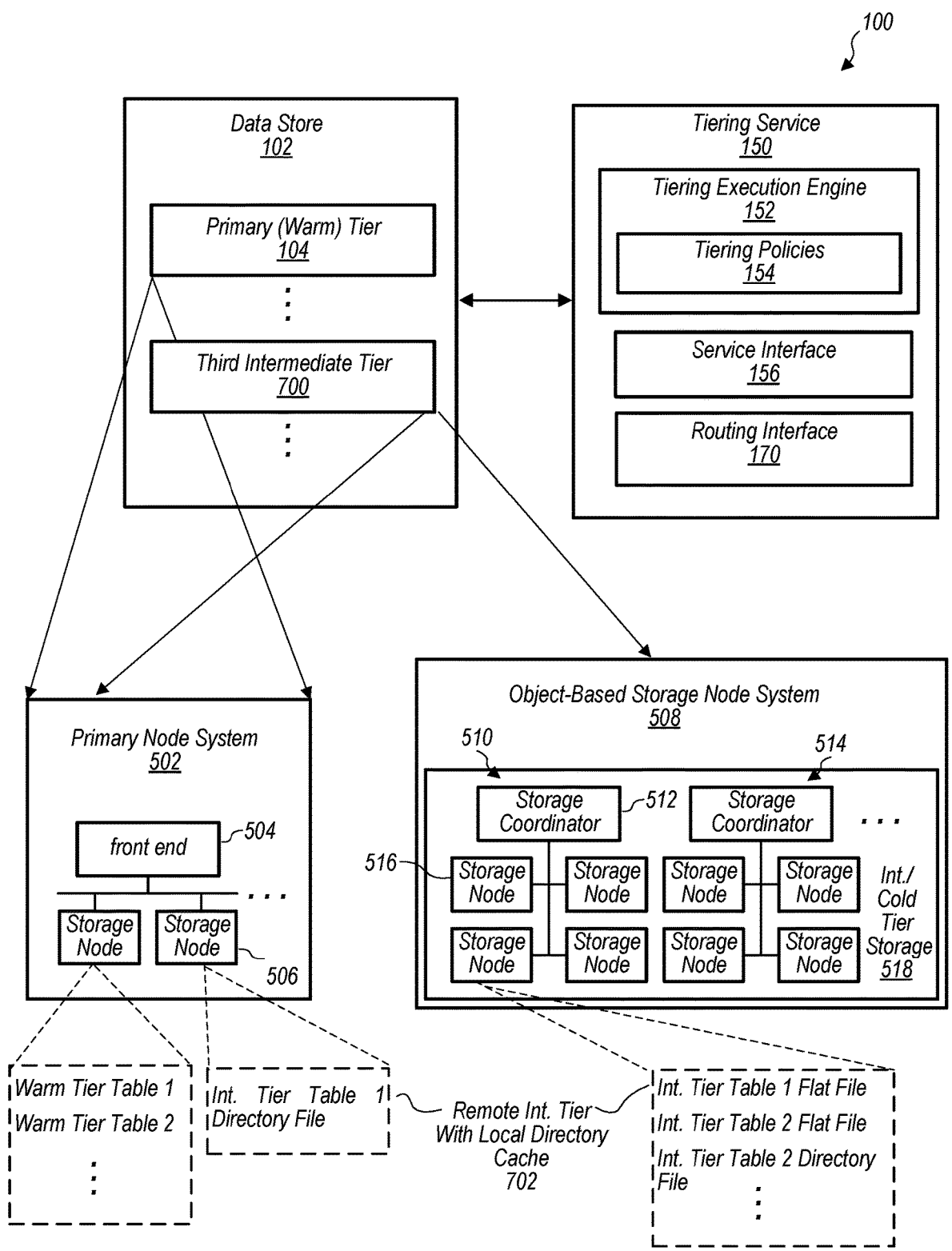
FIG. 7 illustrates an example implementation of a third intermediate tier, according to some embodiments.

FIG. 7 illustrates an example implementation of a third intermediate tier, according to some embodiments.

In some embodiments, a third intermediate tier may be implemented by storing a flat file for the third intermediate tier in a cold tier storage node, such as one of nodes 516 of object-based storage node system 508 and also storing a directory file for the flat file in a cache storage of one of the nodes that implements the warm tier, such as one of nodes 506. For example, third intermediate tier 700 is implemented via remote intermediate tier with local directory cache 702 that includes an intermediate tier table 1 directory file stored in a cache of one of nodes 506 of the primary node system 502 and that also includes an intermediate tier table 1 flat file stored in one of nodes 516 of object-based storage system 508. Note that other flat files that are used to implement other tiers, such as a fourth intermediate tier (discussed in FIG. 7) may also be stored on the node 516 that stores the flat file of the third intermediate tier 700.

In some embodiments, storing a directory file in a cache storage of one of the nodes that also implements the warm tier may reduce an access latency for a data item stored on one of nodes 516 of object-based storage node system 508, as compared to the fourth intermediate tier that includes both a directory file and a flat file stored on one of nodes 516 without a directory file being cached in the warm tier. This is because a routing manager may directly look up the offset of a requested data item in the warm tier via the cached directory file and only be required to make one access to the object-based storage node system 508, as compared to two accesses which would be the case for the fourth intermediate tier, wherein a first access is required to read an offset for a requested data item from a directory file and a second access is then required to read the requested data item from the flat file at the offset retrieved from the directory file.

FIG. 8 illustrates an example implementation of a fourth intermediate tier, according to some embodiments.

As discussed above, a fourth intermediate tier, such as fourth intermediate tier 800, may be implemented by storing an intermediate tier flat file and an intermediate tier directory file in a cold storage node, such as one of nodes 516 of object-based storage node system 508. For example, fourth intermediate tier 800 is implemented via remote intermediate tier with remote directory 802.

FIG. 9 illustrates an example implementation of a fifth intermediate tier, according to some embodiments.

A fifth intermediate tier, such as fifth intermediate tier 900, may be implemented in a similar manner as the fourth intermediate tier. However, a directory file for the fifth intermediate tier may be omitted, e.g. the primary node system 502 and the object-based storage node system 508 may not store a directory file for intermediate table 1 flat file stored in remote intermediate tier without directory 902. Omitting the directory file may compress the size of the RODB file or files that implement the fifth intermediate tier and may therefore reduce storage costs.

In some embodiments, in order to locate a requested data item included in a remote intermediate tier without a directory, such as remote intermediate tier without directory 902, a routing manager, such as routing manager 172, may build an on-demand view of the intermediate tier table 1 flat file in order to locate the requested data item in the fifth intermediate tier 900.

FIG. 10 illustrates an example implementation of a cold tier, according to some embodiments.

In some embodiments, a cold tier, such as cold tier 112, may be implemented via consolidated flat files, for example, two or more of the flat files described in FIGS. 5-9 may be combined into a consolidated flat file. For example, for a given table multiple flat files and corresponding directory files may be generated. However, the different flat files may be consolidated into a single consolidated flat file in the cold tier. Also, the cold tier may not store a directory file for the consolidated flat file. Additionally, or alternatively, a consolidated flat file may include multiple flat files for multiple data scopes, data tables etc. For example, consolidated flat file 1002 includes flat files for table 1 that have been consolidated.

In some embodiments, one or more of the preceding intermediate tiers may be omitted such that the cold tier is not the sixth tier. Also, in some embodiments, the cold tier as described herein may be omitted and one of the previously described intermediate tiers may function as the highest latency tier, e.g. the cold tier. In some embodiments, an even higher latency tier may be used, such that the cold tier described herein is a sixth intermediate tier and the additional higher latency tier is the coldest tier. In some embodiments, a SLA may include rules such that data items are discarded, for example after aging out of a cold tier.

Example Sliding Window Time Slices

Figure 11:
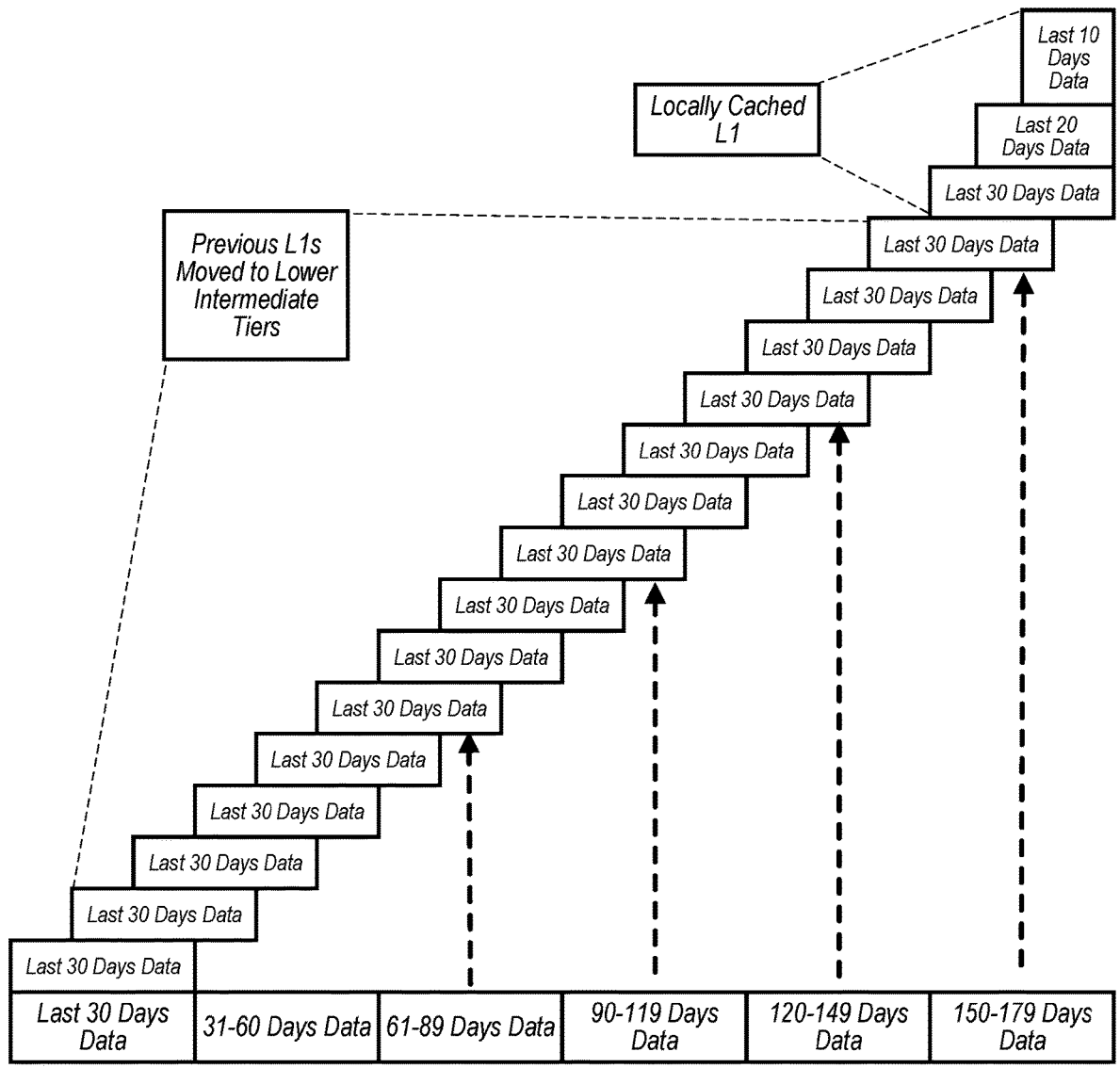
FIG. 11 illustrates an example of organizing data items relocated from a warm tier using a sliding window, wherein data items included in the latest sliding window are locally cached on a warm tier node, according to some embodiments.

FIG. 11 illustrates an example of organizing data items relocated from a warm tier using a sliding window, wherein data items included in the latest sliding window are locally cached on a warm tier node, according to some embodiments.

For example for data items relocated to intermediate tiers, the data items may first be stored in one or more locally cached L1s (layer 1 slices). For example data items for the last 10 days, last 20 days, and/or last 30 days may be included in one or more locally cached L1 time slices. Because the time slices overlap one another, data items are stored in both the last 10 days L1, the last 20 days L1, and the last 30 days L1, such that when an L1 exceeds 30 days, data items included in the L1 that has exceeded 30 days are also stored in the last 10 days L1 or the last 20 days L1. By doing this, data items for the last 30 days are always included in the L1 time slices regardless of when the oldest L1 time slice began or ended. In other time slicing schemes, there is a possibility that a data item could be added to a time slice just before the time slice aged out of the cache. Thus in such systems, data items that are less than X days old (e.g. 30 days old) are not guaranteed to be in the L1 cache, but may be in a L0 cache because the data item was relocated to a "stale" L1 time slice just before the stale L1 time slice aged out of the cache. This problem is avoided with sliding window time slices.

In some embodiments, "last 30 days" time slices that have aged out of a L1 cache are relocated to a lower intermediate tier (e.g. higher latency intermediate tier). The aged "last 30 days" time slices may be combined into a flat file with other aged time slices in one or more of the lower intermediate tiers.

Example Routing of Request Direct to Tiered Data Item

Figure 12:
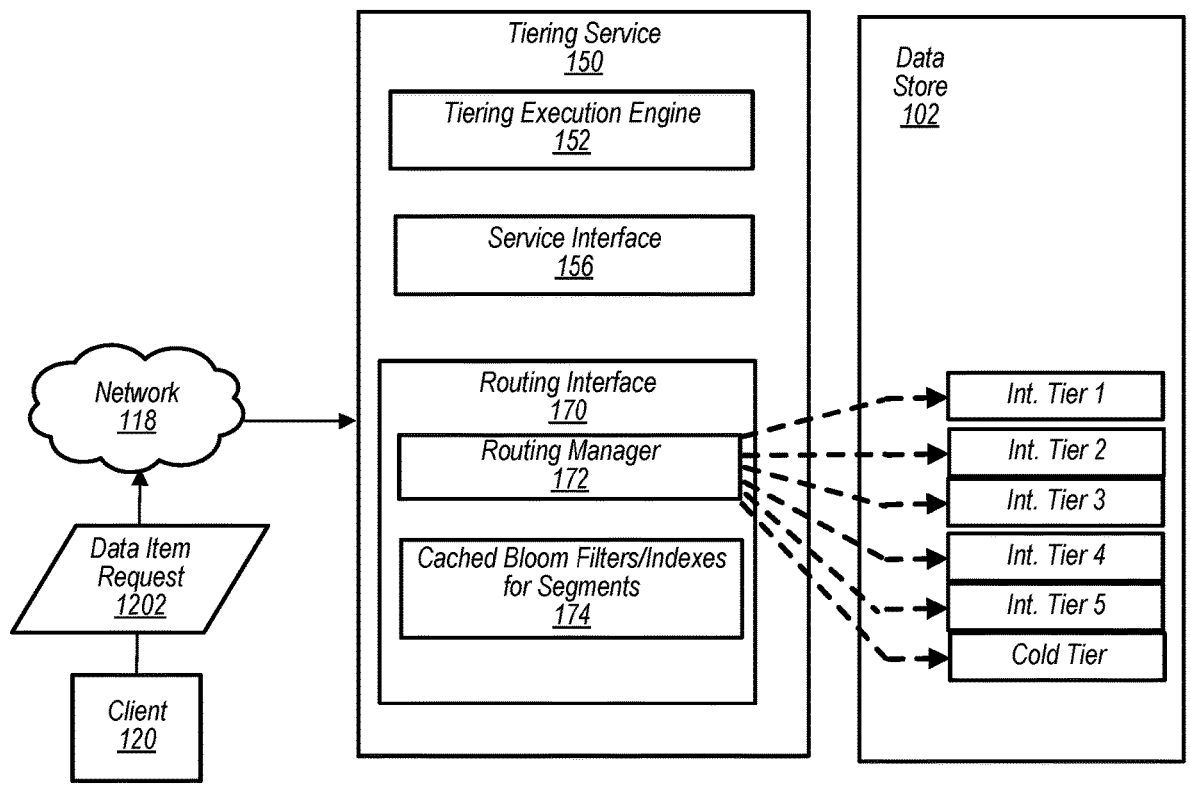
FIG. 12 illustrates a data item request being processed by a routing interface of a tiering service, according to some embodiments.

FIG. 12 illustrates a data item request being processed by a routing interface of a tiering service, according to some embodiments.

In some embodiments, a client, such as client 120, may submit a data item request to a client interface of a data store and the data item request may be routed to a routing interface of a tiering service, such as routing interface 170 of tiering service 150. For example, data item request 1202 is routed via network 118 to routing interface 170 (and may pass through a data store client interface which is not shown). In some embodiments, directory files and/or other index information may be cached in one or more bloom filters/indexes 174 for segments that have been tiered to the intermediate tiers or the cold tier. In some embodiments, a routing interface and/or a routing manager may utilize the bloom filters and/or the indexes to determine a storage location in the intermediate tiers or the cold tier of a requested data item. In some embodiments, a routing manager may first consult a first intermediate tier that is cached on a node that also implements the warm tier and may next consult a cached directory file for a remote intermediate node tier with a local directory cache. If the data item is not included in the locally cached intermediate node, or the remote intermediate node tier with the local directory cache, the routing manager may then consult the cached bloom filters/indexes 174 to determine a storage location of the requested data item. In some embodiments, a routing manager may initially consult the cached bloom filters/indexes 174 before consulting a locally cached intermediate node or a locally cached directory file of a remote intermediate node tier with a local directory cache.

Figure 13:
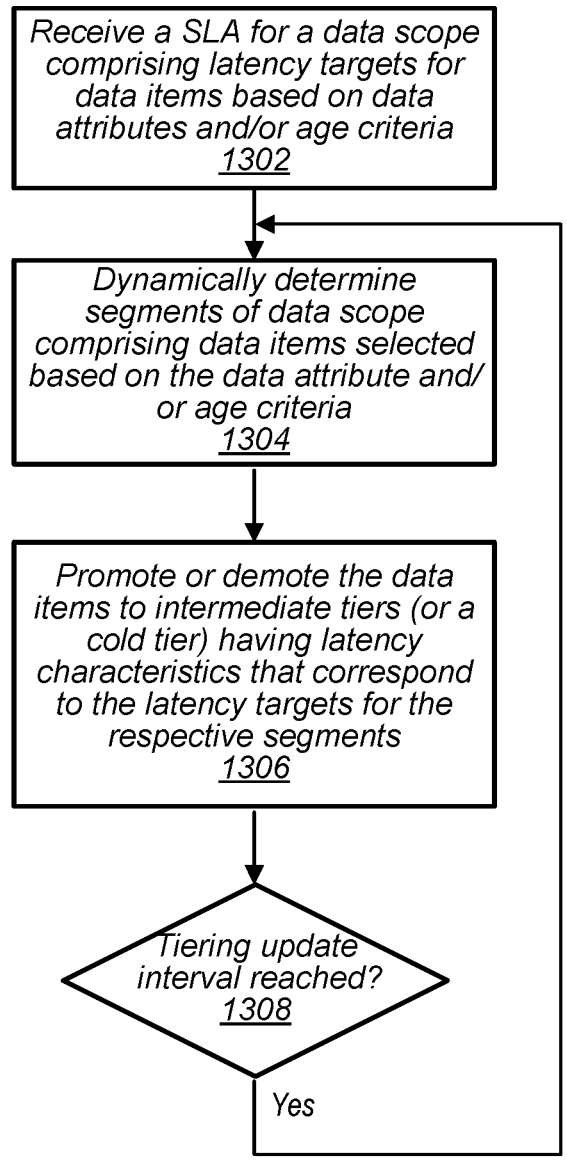
FIG. 13 illustrates a method of tiering data items amongst a warm tier, a plurality of intermediate tiers, and a cold tier, according to some embodiments.

FIG. 13 illustrates a method of tiering data items amongst a warm tier, a plurality of intermediate tiers, and a cold tier, according to some embodiments.

At 1302, a tiering service, such as tiering service 150, receives a service level agreement (SLA) for a data scope (e.g. table), wherein the SLA comprises latency targets for data items falling into various segments, wherein the segments may be defined based on data attributes of the data items, data access patterns of the data items, respective ages of the data items since last accessed or modified, or other characteristics associated with the data items. In some embodiments, the SLA may be selected or defined by a client, for example via an interface to the tiering service as discussed in FIG. 2B.

At 1304, the tiering service dynamically determines segments of the data scope comprising data items matching the respective segmentation criteria. Dynamically determining the segments may include periodically determining the segments based on a tiering interval and/or re-determining the segments in response to modifications of the data items. For example a data item that has a data attribute of "order pending" that has been changed to "order closed" may trigger a dynamic segmentation of the data items and/or an updated segmentation in regards to the data item that has been modified.

At 1306, the tiering service dynamically promotes or demotes data items amongst the intermediate tiers and the cold tier such that the SLA is met. For example, a data item may be promoted or demoted to intermediate tiers that have latency performances that correspond with latency targets for a current segment in which the data item is currently assigned. In some embodiments, data items may be promoted or demoted amongst the intermediate tiers and the cold tier in response to falling into a different segment, for example based on changing characteristics of the data item or based on passage of time since the data item was last modified or accessed.

At 1308, the tiering service may determine if a tiering update interval has been reached and repeat the process. As discussed above, in some embodiments, a tiering service may re-perform determining segments dynamically in response to modifications of the data items without (e.g. before or after) reaching a tiering update interval.

Figure 14:
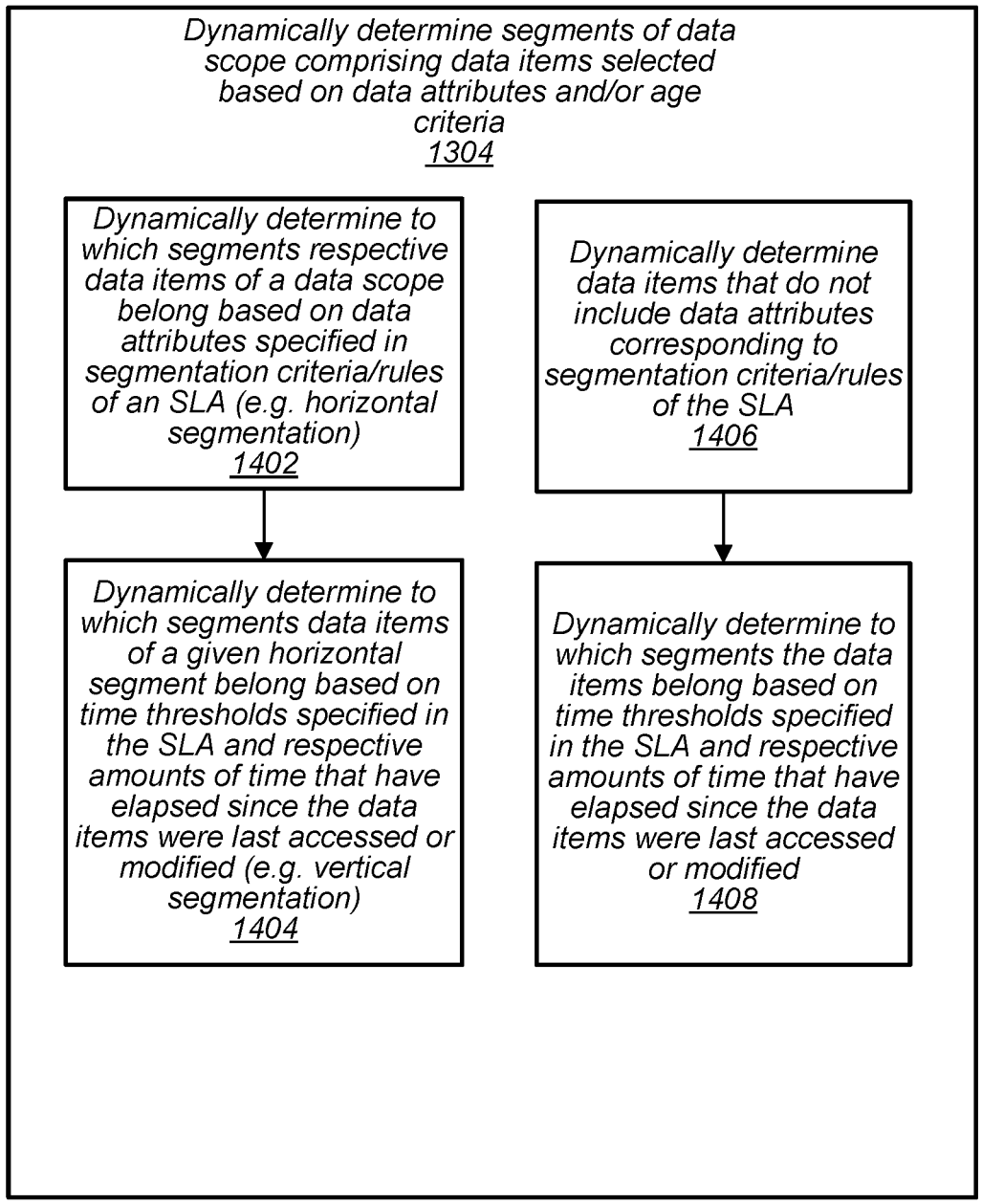
FIG. 14 illustrates additional details for dynamically determining segments of a data scope, according to some embodiments.

FIG. 14 illustrates additional details for dynamically determining segments of a data scope, according to some embodiments.

Dynamically determining segments of a data scope as described in element 1304 of FIG. 13, may further include the elements illustrated in FIG. 14. For example, at 1402, the tiering service may dynamically determine to which segments respective data items of a data scope belong based on data attributes (or characteristics) for data items specified in segmentation criteria/segmentation rules of a SLA. For example, the segmentation criteria/segmentation rules may include horizontal segmentation criteria/segmentation rules for segmenting data items of a common age, and may further include data segmentation criteria/segmentation rules for segmenting data items across time (e.g. vertical segmentation).

For example, at 1404, the data items are vertically segmented based on time thresholds specified in the SLA and respective amounts of time that have elapsed since the data items were last accessed or modified.

At 1406, the tiering service, may determine a group of data items that do not fall within one or more horizontal segmentation criteria/segmentation rules. At 1408, the tiering service may vertically segment the data items not included in a horizontal segment based on respective time thresholds specified in the SLA and respective amounts of time that have elapsed since the data items were last accessed or modified.

In some embodiments, a tiering service may further apply default horizontal segmentation criteria/segmentation rules and/or default vertical segmentation criteria/segmentation rules for data items that are not otherwise covered by segmentation criteria/segmentation rules included in an SLA.

Figure 15:
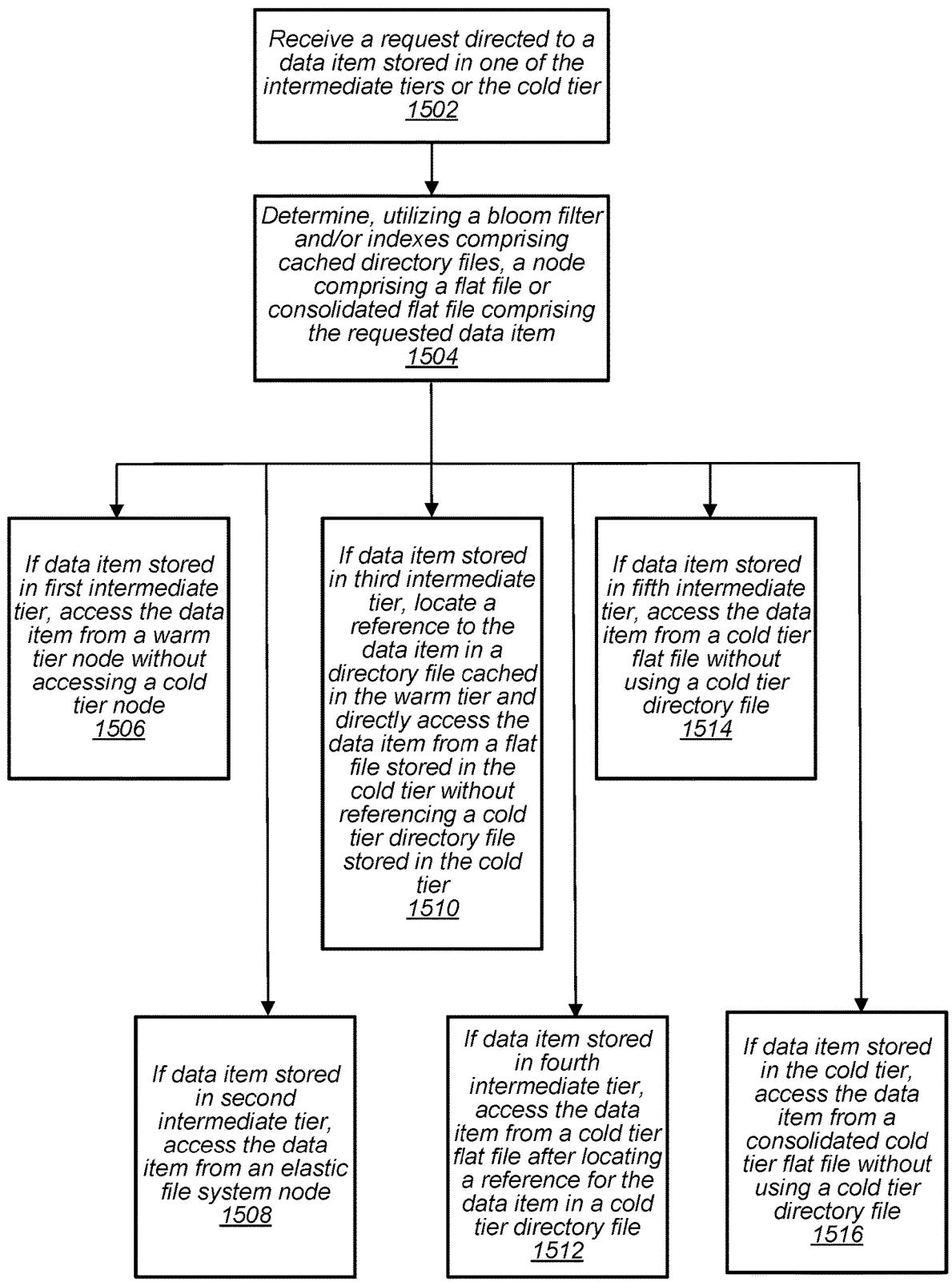
FIG. 15 illustrates a method of processing a request for a data item that has been tiered by a tiering service, according to some embodiments.

FIG. 15 illustrates a method of processing a request for a data item that has been tiered by a tiering service, according to some embodiments.

At 1502, a routing manager receives a request directed to a data item that has been relocated to an intermediate tier or cold tier. At 1504, the routing manager determines, for example using a bloom filter and/or index comprising cached directory files, a node comprising a flat file (or consolidated flat file) that includes the requested directory file.

At 1506, if it is determined that the data item is stored in the first intermediate tier, the data item is accessed from a warm tier node without accessing a cold tier node (e.g. a node of an object-based storage system).

At 1508, if it is determined that the data item is stored in the second intermediate tier implemented via the elastic file system, the data item is accessed from the elastic file system node which may be mounted on a warm tier node. This may be done without accessing a cold tier node, such as a node of an object-based storage system.

At 1510, if it is determined that the data item is stored in the third intermediate tier implemented on a remote node and including a locally cached directory file, the routing manager locates a reference for the data item in the locally cached directory file, cached in the warm tier, and directly accesses the data item from a flat file stored in the cold tier (e.g. on a node of the object-based storage system) without referencing a cold tier directory file of the cold tier.

At 1512, if it is determined that the data item is stored in the fourth intermediate tier that includes a flat file and a directory file stored on a cold tier node (e.g. a node of the object-based storage system), the routing manager accesses the data item from the cold tier flat file after locating a reference for the data item in the cold tier directory file.

At 1514, if it is determined that the data item is stored in the fifth intermediate tier, the routing manager accesses the data item from a cold tier flat file without using a cold tier directory file. For example the routing manager may generate an on-demand view of the cold tier flat file in order to locate the requested data item in the cold tier flat file.

At 1516, if it is determined the data item is stored in the cold tier (e.g. the highest latency tier), the routing manager accesses the data item from a consolidated cold tier flat file without using a cold tier directory file. For example, the routing manager may utilize a service such as Amazon S3 select to locate the data item in the consolidated flat file.

Figure 16:
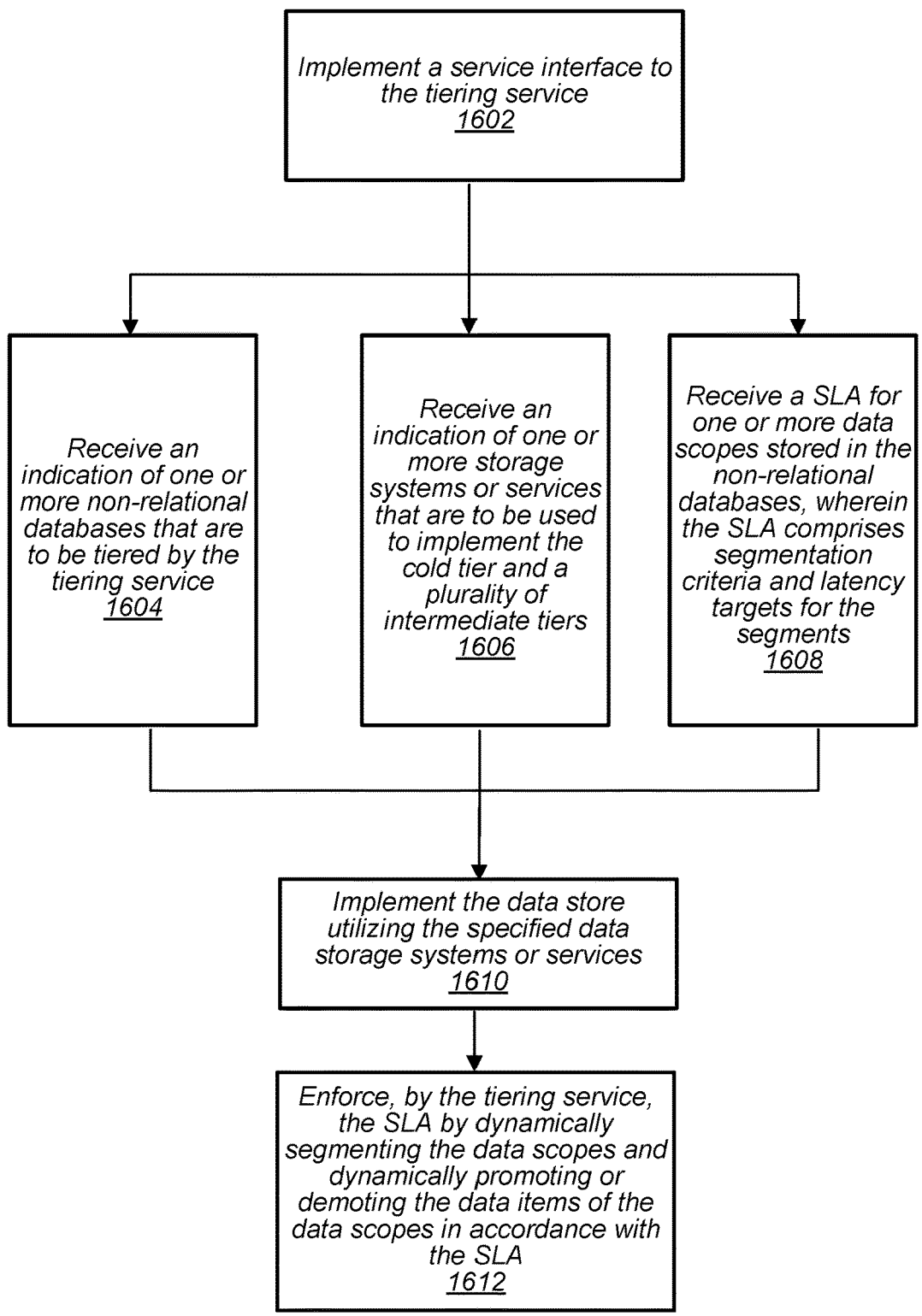
FIG. 16 illustrates a method of configuring a data store and tiering policies of a tiering service, according to some embodiments.

FIG. 16 illustrates a method of configuring a data store and tiering policies of a tiering service, according to some embodiments.

At 1602, the tiering service implements a service interface to the tiering service. For example the service interface may be a web-based service interface as illustrated in FIGS. 2A and 2B, or may be an application programmatic interface or command line interface, or other suitable interface.

At 1604, the tiering service receives, via the service interface, an indication of one or more non-relational databases that are to be tiered by the tiering service.

At 1606, the tiering service receives, via the service interface, an indication of one or more storage systems or services that are to be used to implement the cold tier and a plurality of intermediate tiers.

At 1608, the tiering service receives, via the service interface, a service level agreement (SLA) for one or more data scopes stored in the non-relational databases, wherein the SLA comprises segmentation criteria and latency targets for the segments.

At 1610, the tiering service implements the data store utilizing the specified data storage systems or services.

At 1612, the tiering service enforces the SLA by dynamically segmenting the data scopes and dynamically promoting or demoting the data items of the data scopes in accordance with the SLA.

Illustrative Computer System

Figure 17:
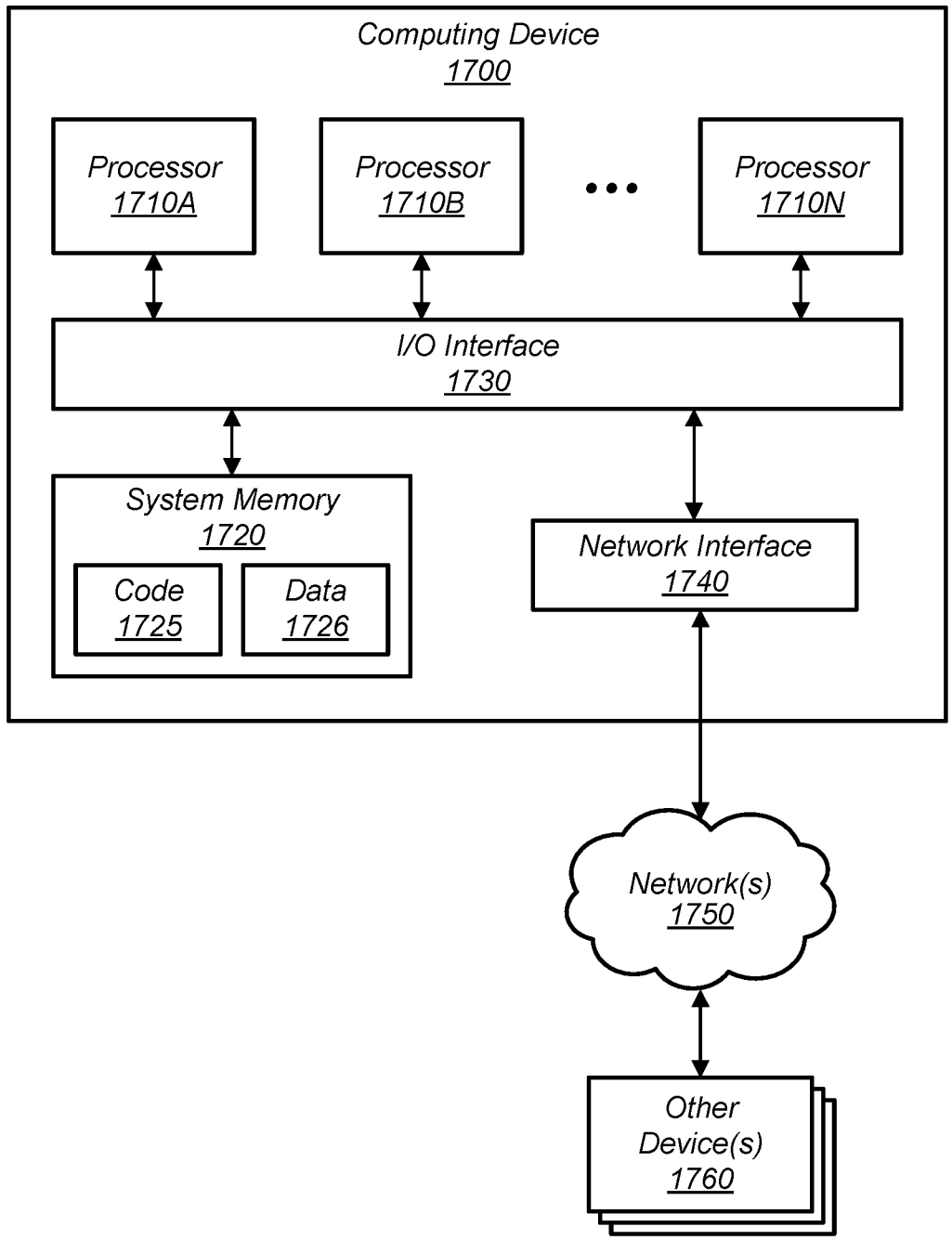
FIG. 17 illustrates an example computing device that may be used in some embodiments.

In at least some embodiments, a computer system that implements a portion or all of one or more of the technologies described herein may include a computer system that includes or is configured to access one or more computer-readable media. FIG. 17 illustrates such a computing device 1700. In the illustrated embodiment, computing device 1700 includes one or more processors 1710A-1710N coupled to a system memory 1720 via an input/output (I/O) interface 1730. Computing device 1700 further includes a network interface 1740 coupled to I/O interface 1730.

In various embodiments, computing device 1700 may be a uniprocessor system including one processor or a multiprocessor system including several processors 1710A-1710N (e.g., two, four, eight, or another suitable number). Processors 1710A-1710N may include any suitable processors capable of executing instructions. For example, in various embodiments, processors 1710A-1710N may be processors implementing any of a variety of instruction set architectures (ISAs), such as the x86, PowerPC, SPARC, or MIPS ISAs, or any other suitable ISA. In multiprocessor systems, each of processors 1710A-1710N may commonly, but not necessarily, implement the same ISA.

System memory 1720 may be configured to store program instructions and data accessible by processor(s) 1710A-1710N. In various embodiments, system memory 1720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1720 as code (i.e., program instructions) 1725 and data 1726.

In one embodiment, I/O interface 1730 may be configured to coordinate I/O traffic between processors 1710A-1710N, system memory 1720, and any peripheral devices in the device, including network interface 1740 or other peripheral interfaces. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processors 1710A-1710N.

Network interface 1740 may be configured to allow data to be exchanged between computing device 1700 and other devices 1760 attached to a network or networks 1750. In various embodiments, network interface 1740 may support communication via any suitable wired or wireless general data networks, such as types of Ethernet network, for example. Additionally, network interface 1740 may support communication via telecommunications/telephony networks such as analog voice networks or digital fiber communications networks, via storage area networks such as Fibre Channel SANs, or via any other suitable type of network and/or protocol.

In some embodiments, system memory 1720 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1700 via I/O interface 1730. One or more non-transitory computer-readable storage media may also include any volatile or non-volatile media such as RAM (e.g. SDRAM, DDR SDRAM, RDRAM, SRAM, etc.), ROM, etc., that may be included in some embodiments of computing device 1700 as system memory 1720 or another type of memory. Further, a computer-readable medium may include transmission media or signals such as electrical, electromagnetic, or digital signals, conveyed via a communication medium such as a network and/or a wireless link, such as may be implemented via network interface 1740. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system comprising:
one or more nodes configured to implement a data store comprising a warm tier, one or more intermediate tiers, and a cold tier; and
one or more computing devices for implementing a tiering execution service configured to:
receive one or more data items,
receive a tiering policy comprising:
segmentation criteria comprising one or more data attributes and one or more time attributes for determining at least one data segment of one or more data segments that at least one data item of the one or more data items belongs, wherein the one or more data attributes are associated with the at least one data item of the one or more data items and the one or more time attributes indicate a time event associated with the at least one data item, wherein the one or more data attributes comprises a string of one or more alpha-numeric characters, and
a corresponding latency target for each data segment of the one or more data segments,
assign the at least one data item of the one or more data items to the at least one data segment of the one or more data segments based on the one or more data attributes and the one or more time attributes,
store the at least one data item of the one or more data items in a first tier, wherein the first tier comprises at least one of the warm tier, a first intermediate tier of the one or more intermediate tiers, or the cold tier, and
demote the at least one data item of the one or more data items from the first tier to a second tier comprising an elastic file system, having a higher access latency than the first tier, based on:
the at least one data segment of the one or more data segments assigned to the at least one data item of the one or more data items, and
at least one latency target corresponding to the at least one data segment of the one or more data segments.

2. The system of claim 1, wherein the time event comprises at least one of:
one or more time thresholds indicating a most recent time since the at least one data item of the one or more data items was accessed or modified, or
an age of the at least one data item of the one or more data items.

3. The system of claim 1, wherein the second tier comprises at least one of the one or more intermediate tiers or the cold tier.

4. The system of claim 3, wherein, when the first tier comprises the warm tier, the second tier comprises at least one of the one or more intermediate tiers or the cold tier.

5. The system of claim 3, wherein, when the first tier comprises the first intermediate tier of the one or more intermediate tiers, the second tier comprises at least one of a second intermediate tier of the one or more intermediate tiers or the cold tier.

6. The system of claim 1, wherein at least one of at least one intermediate tier of the one or more intermediate tiers or the cold tier are implemented on nodes of the data store comprising equivalent hardware configurations, and wherein the tiering execution service causes a greater amount of metadata to be stored for data items in an intermediate tier with a lower latency than another intermediate tier with a higher latency.

7. A method implemented by a computing system for a tiering execution service comprising:
receiving one or more data items;
receiving a tiering policy comprising:
segmentation criteria comprising one or more data attributes and one or more time attributes for determining at least one data segment of one or more data segments that at least one data item of the one or more data items belongs, wherein the one or more data attributes are associated with the at least one data item of the one or more data items and the one or more time attributes indicate a time event associated with the at least one data item, wherein the one or more data attributes comprises a string of one or more alpha-numeric characters, and
a corresponding latency target for each data segment of the one or more data segments,
assigning the at least one data item of the one or more data items to the at least one data segment of the one or more data segments based on the one or more data attributes and the one or more time attributes,
storing the at least one data item of the one or more data items in a first tier of a data store, wherein the first tier comprises at least one of a warm tier of the data store, a first intermediate tier of one or more intermediate tiers of the data store, or a cold tier of the data store, and
demoting the at least one data item of the one or more data items from the first tier to a second tier comprising an elastic file system, having a higher access latency than the first tier, based on:
the at least one data segment of the one or more data segments assigned to the at least one data item of the one or more data items, and
at least one latency target corresponding to the at least one data segment of the one or more data segments.

8. The method of claim 7, wherein the one or more time attributes comprise:
criteria for including the at least one data item of the one or more data items in at least one respective data segment of the one or more data segments based on at least one time threshold of one or more time thresholds since the at least one data item of the one or more data items was last accessed or modified, wherein the at least one data item of the one or more data items is segmented based on an age of the at least one data item.

9. The method of claim 7, wherein the one or more data attributes comprise:
criteria for including the at least one data item of the one or more data items in at least one respective data segment of the one or more data segments based on data of the at least one data item;
wherein the at least one data item of the one or more data items is segmented based on the data of the at least one data item.

10. The method of claim 7, wherein data items of the one or more data items having common attributes are included in a common horizontal segment determined based on data attributes of the data items, and wherein the data items of the one or more data items of the common horizontal segment are further vertically segmented based on the respective ages of the data items, wherein different versions of data items of the one or more data items are included in different vertical segments of a plurality of vertical segments of a given horizontal segment, and wherein a most recent vertical segment of the given horizontal segment is stored in an intermediate tier of the one or more intermediate tiers of the data store implemented via the one or more cache storages of one or more nodes of the data store that also implement the warm tier.

11. The method of claim 7, wherein data items of the one or more data items stored in a second intermediate tier implemented via one or more cache storages of one or more nodes of the data store that also implement the warm tier are:
included in a warm tier flat file stored in the one or more cache storage of the one or more nodes of the data store that also implement the warm tier; and
referenced in a warm tier directory file stored in the one or more cache storages of the one or more nodes of the data store that also implement the warm tier.

12. The method of claim 11, wherein the elastic file system is implemented using nodes distinct from the one or more nodes that implement the warm tier.

13. The method of claim 12, wherein data items of the one or more data items demoted to a third intermediate tier of the second tier and having a higher latency than the first intermediate tier and an additional intermediate tier of the one or more intermediate tiers of the data store are:
included in one or more cold tier flat files stored on one or more nodes that implement the cold tier, wherein the one or more nodes that implement the cold tier are distinct from the one or more nodes that implement the warm tier, and
referenced in a warm tier directory file that references the data items stored in the flat file on the one or more nodes that implement the cold tier, wherein the warm tier directory file is stored in one or more cache storages of one or more of the nodes that also implement the warm tier.

14. The method of claim 13, wherein data items of the one or more data items demoted to a fourth intermediate tier of the one or more intermediate tiers of the data store and having a higher latency than the first intermediate tier, the additional intermediate tier, and the third intermediate tier are:
included in one or more cold tier flat files stored on one or more of the nodes that also implement the cold tier; and
referenced in a cold tier directory file for the one or more cold tier flat files, wherein the cold tier directory file is stored on the one or more nodes that also implement the cold tier.

15. The method of claim 14, wherein data items of the one or more data items demoted to a fifth intermediate tier of the one or more intermediate tiers of the data store and having a higher latency than the preceding intermediate tiers are:
included in one or more cold tier flat files stored on one or more of the nodes that implement the cold tier without a directory file being stored for the one or more cold tier flat files of the fifth intermediate tier.

16. The method of claim 15, wherein data items of the one or more data items demoted to the cold tier, which has a higher latency than the fifth intermediate tier and the preceding intermediate tiers, are:
included in a consolidated cold tier flat file that combines two or more of the cold tier flat files into the consolidated cold tier flat file, wherein the consolidated cold tier flat file is stored on one or more of the nodes that implement the cold tier without a directory file being stored for the consolidated cold tier flat file.

17. The method of claim 16, further comprising:
receiving a request for a data item of the one or more data items and stored in one of the plurality of intermediate tiers or the cold tier; and
in response to determining the requested data item is stored in the first intermediate tier implemented via the one or more cache storages of the one or more nodes that also implement the warm tier, returning the requested data item from one of the cache storages of one of the nodes that implement the warm tier;
in response to determining the requested data item is not stored in the first intermediate tier, determining whether the requested data item is referenced in a warm tier directory file stored in one of the cache storages of one of the nodes that implement the warm tier, and retrieving the requested data item from a cold tier flat file stored on a cold tier node, wherein the data item is retrieved from the cold tier flat file based on directory information for the requested data item included in the warm tier directory file stored in the cache storage of the warm tier node; or
in response to determining the requested data item is not stored in the first intermediate tier and is not stored in one or more warm tier directory files stored in one or more cache storages of one or more of the nodes that implement the warm tier, utilizing one or more bloom filters or one or more indexes to determine which of the cold tier nodes includes a flat file or consolidated flat file comprising the requested data item.

18. The method of claim 7, further comprising:
implementing a service interface to the data tiering service, wherein the service interface is configured to:
receive an indication of one or more non-relational databases that include data scopes comprising data items that are to be tiered by the data tiering service; and
receive an indication of one or more storage systems or services that are to be used by the data tiering service to implement a cold tier and a plurality of intermediate tiers,
wherein the plurality of intermediate tiers and the cold tier are implemented using the one or more indicated storage systems or services, and
wherein the data tiering service demotes the data items of the one or more indicated non-relational databases amongst the warm tier, the plurality of intermediate tiers, and the cold tier in conformance with a service level agreement (SLA).

19. One or more non-transitory, computer-readable storage media storing instructions that, when executed on or across one or more processors, cause the one or more processors to:
receive one or more data items;
receive a tiering policy comprising:
segmentation criteria comprising one or more data attributes and one or more time attributes for determining at least one data segment of one or more data segments that at least one data item of the one or more data items belongs, wherein the one or more data attributes are associated with the at least one data item of the one or more data items and the one or more time attributes indicate a time event associated with the at least one data item, wherein the one or more data attributes comprises a string of one or more alpha-numeric characters, and
a corresponding latency target for each data segment of the one or more data segments,
assign the at least one data item of the one or more data items to the at least one data segment of the one or more data segments based on the one or more data attributes and the one or more time attributes,
store the at least one data item of the one or more data items in a first tier of a data store, wherein the first tier comprises at least one of a warm tier, a first intermediate tier of the one or more intermediate tiers, or a cold tier, and
demote the at least one data item of the one or more data items from the first tier to a second tier comprising an elastic file system, having a higher access latency than the first tier, based on:
the at least one data segment of the one or more data segments assigned to the at least one data item of the one or more data items, and
at least one latency target corresponding to the at least one data segment of the one or more data segments.

20. The one or more non-transitory computer-readable media of claim 19, wherein the instructions, when executed on or across the one or more processors, cause the one or more processors to:
implement a service interface to the data tiering service, wherein the service interface is configured to:
receive segmentation rules, from a client of the data tiering service, for use in determining the segmentation criteria.

* * * * *